(12) United States Patent
Chong et al.

(10) Patent No.: US 10,564,385 B2
(45) Date of Patent: Feb. 18, 2020

(54) MEMS DEVICE FOR LENS BARREL POSITIONING

(71) Applicants: NINGBO SUNNY OPOTECH CO., LTD., Ningbo, Zhejiang (CN); Nanyang Techological University, Singapore (SG)

(72) Inventors: Nyok Boon Chong, Singapore (SG); Cheng Yi Lim, Singapore (SG); Zhenyu Chen, Ningbo (CN); Gih Keong Lau, Singapore (SG); Chuangui Zhu, Singapore (SG)

(73) Assignees: Ningbo Sunny Opotech Co., Ltd., Ningbo, Zhejiang (CN); Nanyang Technological University, Singapore (SG)

( * ) Notice: Subject to any disclaimer, the term of this patent is extended or adjusted under 35 U.S.C. 154(b) by 163 days.

(21) Appl. No.: 15/426,997

(22) Filed: Feb. 7, 2017

(65) Prior Publication Data
US 2017/0254978 A1    Sep. 7, 2017

(30) Foreign Application Priority Data
Mar. 3, 2016    (SG) .......................... 10201601620W

(51) Int. Cl.
*G02B 7/09*    (2006.01)
*G02B 27/64*    (2006.01)

(52) U.S. Cl.
CPC ............ *G02B 7/09* (2013.01); *G02B 27/646* (2013.01)

(58) Field of Classification Search
CPC . G02B 7/08; G02B 7/04; G02B 7/102; G02B 7/023; G02B 7/10; G02B 7/02; G02B 7/021; G02B 27/646; G02B 7/022; G02B 7/026; G02B 15/14; G02B 7/09; G02B 13/001; G02B 13/0075; G02B 15/10; G02B 26/0875; G02B 7/004; G02B 7/14; G02B 7/282; G02B 13/0035; G03B 3/10; G03B 5/00; G03B 17/14; G03B 2205/0046; G03B 3/00; G03B 13/34; G03B 17/04; G03B 17/08; G03B 21/142; G03B 2205/0053;
(Continued)

(56) References Cited

U.S. PATENT DOCUMENTS 5,720,169 A * 2/1998 Schneider ................. F03G 7/06
60/528
2013/0057757 A1* 3/2013 Ryou ....................... G02B 7/08
348/374

(Continued)

*Primary Examiner* — Evan P Dzierzynski
*Assistant Examiner* — Sharrief I Broome
(74) *Attorney, Agent, or Firm* — Raymond Y. Chan; David and Raymond Patent Firm

(57) ABSTRACT

The Micro electro-mechanical system (MEMS) utilizes thermal micro-actuators for lens barrel positioning in a camera module for smart device such as mobile phone. The micro actuators are radially extended from a lens barrel, wherein each of the micro actuators is bendable in response to thermal energy. A control unit includes a heater circuit operatively linked to the micro actuators to controllably apply the thermal energy to each of the micro actuators, wherein each of the micro actuators is bent correspondingly to move the lens barrel with respect to the base so as to control a 3-axis positioning of the lens barrel. The micro actuators are also operated independent of ambient temperature.

14 Claims, 21 Drawing Sheets

(58) Field of Classification Search
CPC .... G03B 2205/0061; G03B 2205/0084; G03B 13/36; G03B 17/12; G03B 17/565; G03B 19/12; G03B 21/14; G03B 2205/00; G03B 2205/0069; G03B 2205/0092
See application file for complete search history.

(56) References Cited

U.S. PATENT DOCUMENTS

| | | | |
|---|---|---|---|
| 2013/0077168 A1* | 3/2013 | Gutierrez | H02N 1/006 359/554 |
| 2014/0028905 A1* | 1/2014 | Kim | H04N 5/2257 348/374 |
| 2015/0212291 A1* | 7/2015 | Lee | G02B 7/08 348/360 |

* cited by examiner

MEMS DEVICE FOR LENS BARREL POSITIONING

CROSS REFERENCE OF RELATED APPLICATION

This is a non-provisional application that claims priority to Singapore application number SG10201601620 W, filing date Mar. 3, 2016, wherein the entire content of which is expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the camera module commonly installed in smart device camera. It is used to position a lens barrel in the camera module to achieve high quality images for image capturing, such as photography or videography. In particular, the invention relates to a thermally driven micro actuator that is capable of carrying out autofocus and suppressing hand jitter for camera module in smart devices.

Description of Related Arts

Autofocus function is commonly applied in commercial cameras. It utilizes linear actuators to position the lenses in a camera to shift the focal point of the lenses onto the image sensor. If the focal point of the lens is not on the surface of the image sensor, it results in a blur image. The technology is difficult to implement for smart phone camera modules due to miniaturization issues of the linear actuator.

Voice coil motors (VCM) and micro-electromechanical systems (MEMS) are found to be suitable drivers for mobile phone autofocus camera modules. Currently, VCM is the existing actuator used for lens barrel positioning in autofocus camera module. In particular, Voice coil motor (VCM) is currently used in mobile phone camera module for lens barrel positioning. In recent years, VCM has also been adopted in mobile phones for suppressing hand shake. The lens barrel is held in place by springs which work against the VCM actuation for positioning control. As the springs used are soft, the lens barrel tilts and is subjected to ringing when in motion. This accounts for poor edge image quality and lengthened focusing time.

U.S. Pat. Nos. 8,064,153 and 8,849,106, disclose an electromagnetically driven device characterized in that the movable member holds the lens unit, wherein the driving coil wound around the Z axis is mounted on an outer circumferential side of the movable member, and that the coil set for swinging is mounted on an inner circumferential side of the driving coil, as shown in FIG. 1A. With this configuration, the device provides a tightly structured lens driving device having an auto-focus driving function and a shake suppression function built in. As shown in FIG. 1B, arranging the coil set for swinging at the inner circumferential side of the driving coil achieves the same effect.

If a current $I_D$ flows in the counterclockwise direction in the driving coil, as shown in FIGS. 1C and 1D, a Lorentz force $F_L$ in a direction toward the +Z side is generated at each of the sides of the driving coil. A clockwise current flowing in a direction reverse to the direction indicated can be applied to the driving coil to cause the movement of the lens holder in a direction toward the −Z side. This Z-direction movement serves the function of autofocus. In addition, the current flows in the coil set, resulting in another Lorentz force in +R direction, which in turn drives the lens to suppress the shake in the −R direction.

When the current $I_D$ flows in the counterclockwise direction in the driving coil, a Lorentz force $F_L$ in a direction toward the +Z side, and the direction of the current flows in the coil set for +R direction swing of the shake suppression device and the Lorentz force acting upon the driving coil.

Though the above invention enables both functions of autofocus and optical image stabilization, the complex configuration of coils and magnets is the major shortcoming. As a matter of fact, with the increasing high expectation from users on camera function of mobile phones and smart devices, the fate of VCM is about to reverse as it has problems meeting the stringent requirements of high precision focusing accuracy, fast focusing speed, low power consumption and slim body of next-generation smartphones. Several new technologies such as MEMS, liquid lens and liquid crystal lens have been developed with the aim of replacing VCM.

There are Micro Electro-Mechanical systems (MEMS) that are also used for lens positioning. Electrostatic actuators (Invensas) are used to drive a single lens in an autofocus module. Electrostatic MEMS actuators have recently been introduced as lens drivers with the advantages of being small, compact, energy saving, and good for portable devices. However, the electrostatic MEMS actuators can only move a single lightweight lens, instead of the whole lens barrel with multiple optical lenses, given their low stiffness and force generation. Adoption of this MEMS autofocus required a re-design of current optics for best performance. It cannot directly replace the VCM that moves the whole lens barrel. In other words, the electrostatic actuator is limited to driving a single lens due to the low force generation by an electrostatic actuator. Adoption of this technology would force a redesign of current optics; hence the adoption rate is low. The present invention introduces an electro-thermally activated MEMS actuator device which promises to replace the VCM as the lens barrel driver without any major changes to existing optics.

SUMMARY OF THE PRESENT INVENTION

The novelty of this invention is the application of thermal bimorphs to build a system which is able to apply fast precise positioning of a lens barrel in an autofocus camera module for smart device such as mobile phone.

Voice coil motor (VCM) is currently used in mobile phone camera module to move a lens barrel for autofocus positioning. The lens barrel is held in place by springs which work against the VCM actuation for positioning control. As the springs used are soft, the lens barrel tilts and is subjected to ringing when in motion. This accounts for poor image edge focus and long duration for focusing. The present invention of thermal MEMS positioning device has a higher mechanical stiffness as compared to the VCM system, hence it is able to avoid ringing during the lens barrel positioning.

The rectilinear motion of the stage does not have any off axis movement and avoids tilting of the lens barrel for better focus on the image edges.

Electrostatic MEMS actuators (Invensas) are used to drive a single lens (generally 40 mg) in an autofocus camera module for fast and accurate positioning. However, such electrostatic actuator has a force and stroke limitation which makes adoption of the technology poor and thus can only generate a low force, inadequate to move the whole lens barrel with multiple optical lenses (200 mg or more). In addition, the electrostatic device requires a complex design of springs and hinges, and a lot number of parts. The increased design complexity causes higher manufacturing costs. Furthermore, application of such technology would require the re-design of optics lenses, instead of using the existing lens barrel. The present invention of thermal MEMS positioning device is monolithic. Its fabrication is easy as compared to that of electrostatic actuators. The thermal micro actuator is able to generate high thermal stresses, which translates to higher force generation. The increased force output is able to drive the existing lens barrel with multiple optical lenses instead of a single lens. High stiffness of the device also minimizes ringing when positioning the lens barrel. Depending on the configuration used, the invention is able to control up to 3-axis positioning of the lens barrel. This invention can be used with existing optics in a camera module as a simple replacement to the VCM. Also, depending on the control configuration used, active correction of the tilt of lens barrel is possible compared to the VCM.

Accordingly, the present invention is advantageous in that it provides a camera module for positioning a lens barrel therein to achieve high quality images for photography or videography. In particular, the invention relates to a thermally driven micro actuator that is capable of carrying out autofocus and suppressing hand jitter for camera module in smart devices, such as mobile phones.

Another advantage of the invention is to provide thermal micro actuators which are about to provide large force and stoke required for lens barrel positioning in a smart phone camera module, wherein the thermal micro actuators can be configured for up to 3-axis positioning control while independent of ambient temperature.

Another advantage of the invention is to provide a MEMS system, wherein the camera module has lesser structural components comparing with the VCM driven camera module.

Another advantage of the invention is to provide a MEMS thermal micro actuator that precise actuation leads to better image quality for photography/videography.

Additional advantages and features of the invention will become apparent from the description which follows, and may be realized by means of the instrumentalities and combinations particular point out in the appended claims.

According to the present invention, the foregoing and other objects and advantages are attained by a camera module for a portable electronic device, comprising a base, a lens barrel, and a lens barrel positioning device.

The lens barrel positioning device comprises two or more micro actuators and a control unit. The micro actuators are operatively linked between the base and the lens barrel at a position that the micro actuators are radially extended from the lens barrel, wherein each of the micro actuators is bendable in response to thermal energy.

In one embodiment, each of the micro actuators can generate out-of-plane bending in responsive to thermal energy.

In one embodiment, four micro actuators are provided at four corners of the base that can bend the circular base in −Z direction simultaneously, which in turn moves down the whole carrier and lens barrel to carry out autofocus function.

The control unit comprises at least a heater circuit operatively linked to the micro actuators to controllably apply the thermal energy to each of the micro actuators, wherein each of the micro actuators is bent correspondingly to move the lens barrel with respect to the base so as to control a 3-axis positioning of the lens barrel.

In accordance with another aspect of the invention, the present invention provides a method of manufacturing a camera module, comprising the following steps.

(1) Provide a plurality of micro actuators, wherein each of the micro actuators is bendable in response to thermal energy.

(2) Operatively link the micro actuators between a base and a lens barrel at a position that the micro actuators are radially extended from the lens barrel.

(3) Controllably apply the thermal energy by a heater circuit to each of the micro actuators, wherein each of the micro actuators is bent correspondingly to move the lens barrel with respect to the base so as to control a 3-axis positioning of the lens barrel.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 1A to 1D illustrate an electromagnetically driven device of a prior art, wherein FIG. 1A shows a Coil set for swinging (i.e. for anti-shaking function) being mounted on inner circumferential side of the driving coil (i.e. for autofocus function); FIG. 1B shows the coil set for swinging at the inner circumferential side of the driving coil; FIG. 1C shows an oblique view illustrating the relation between the coil set for swinging and the permanent magnet set; FIG. 1D show the current $I_D$ flows in the counterclockwise direction in the driving coil, a Lorentz force $F_L$ in a direction toward the +Z side, and the direction of the current flows in the coil set for +R direction swing of the shake suppression device and the Lorentz force acting upon the driving coil.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Fast and precise positioning of the lens barrel in the mobile phone camera module is important for high image quality. The present invention provides Micro Electro-Mechanical Systems (MEMS) for use due to the small size and capability for fast and accurate positioning. Accordingly, the conventional designs have a force and stroke limitation which makes adoption of the technology poor. The system of the present invention utilizes thermal micro-actuators for lens barrel positioning in a mobile phone camera module. Thermal micro-actuators are able to provide the large force and stroke required for the camera module. This system can be configured for up to 3-axis (XYZ) positioning control. The present invention also discloses methods to achieve a thermal actuator system that is independent of ambient temperature.

Figure 1A:
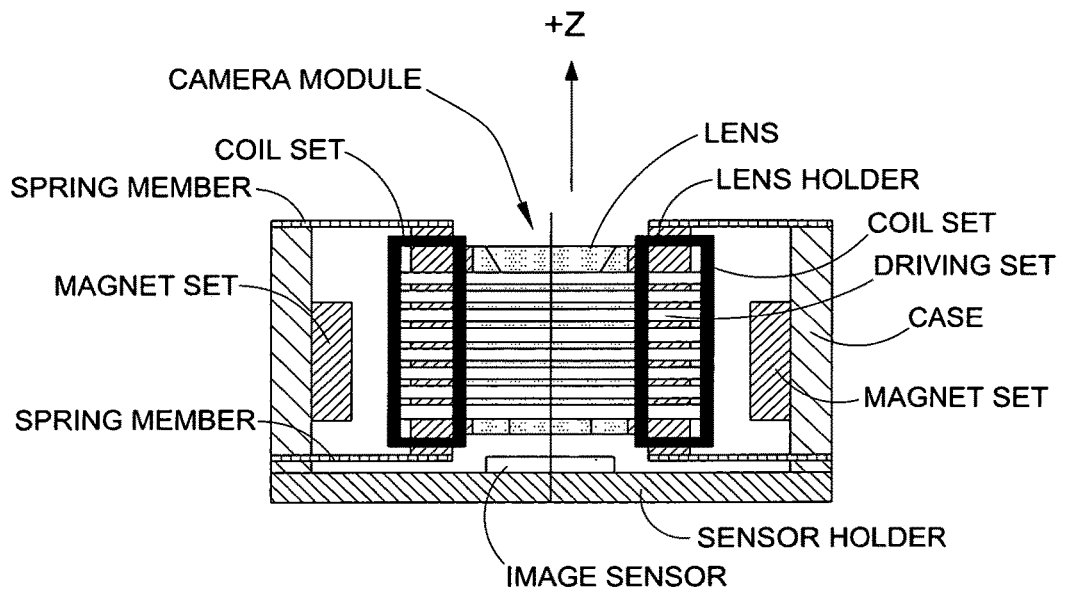
Figure 1B:
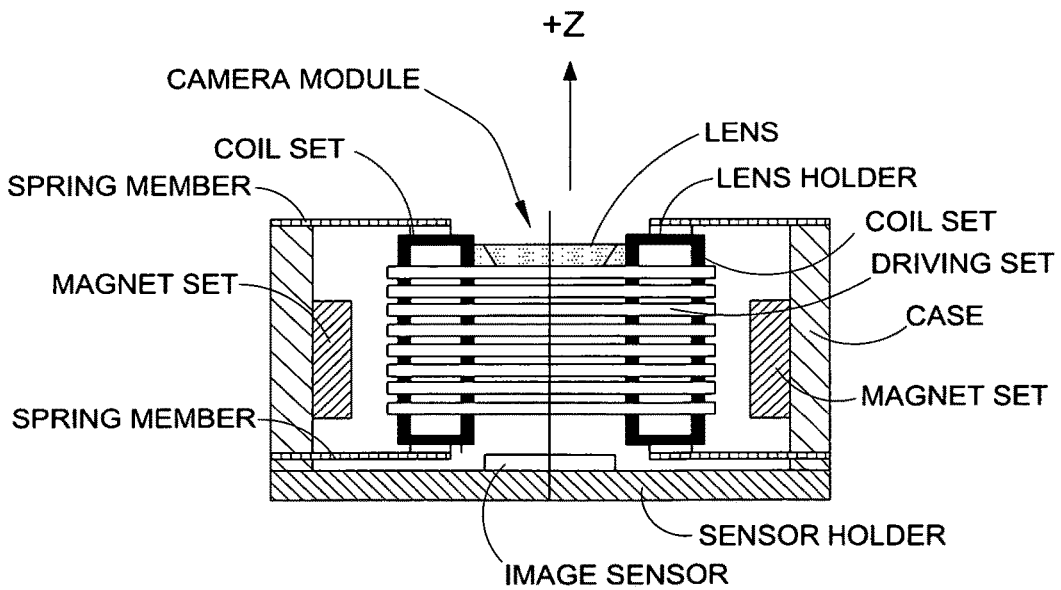
Figure 1D:
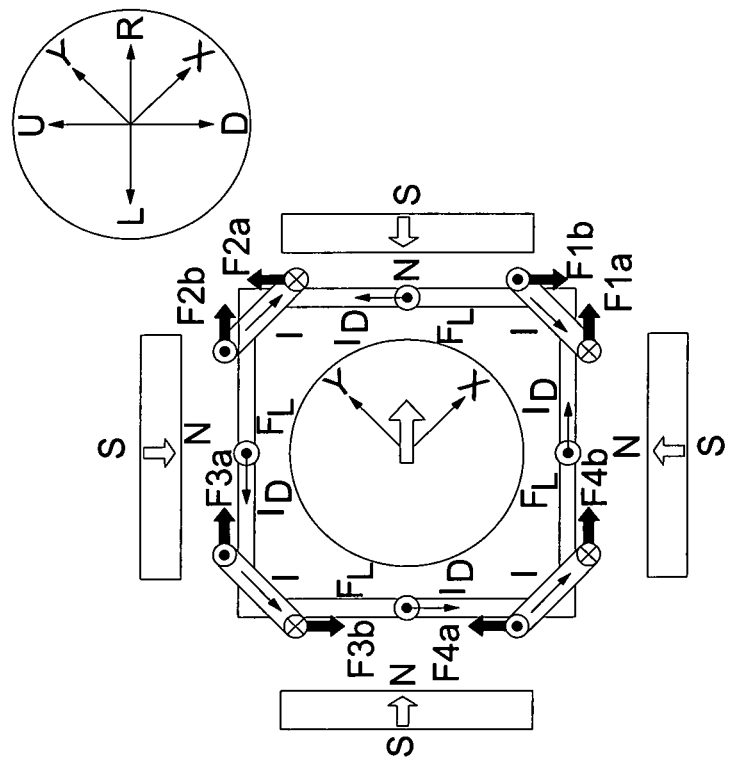
Figure 1C:
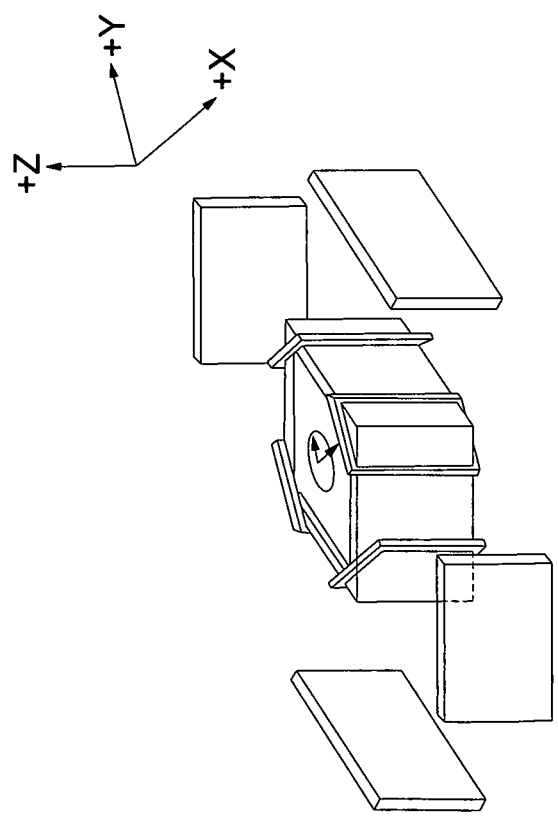
Figure 2:
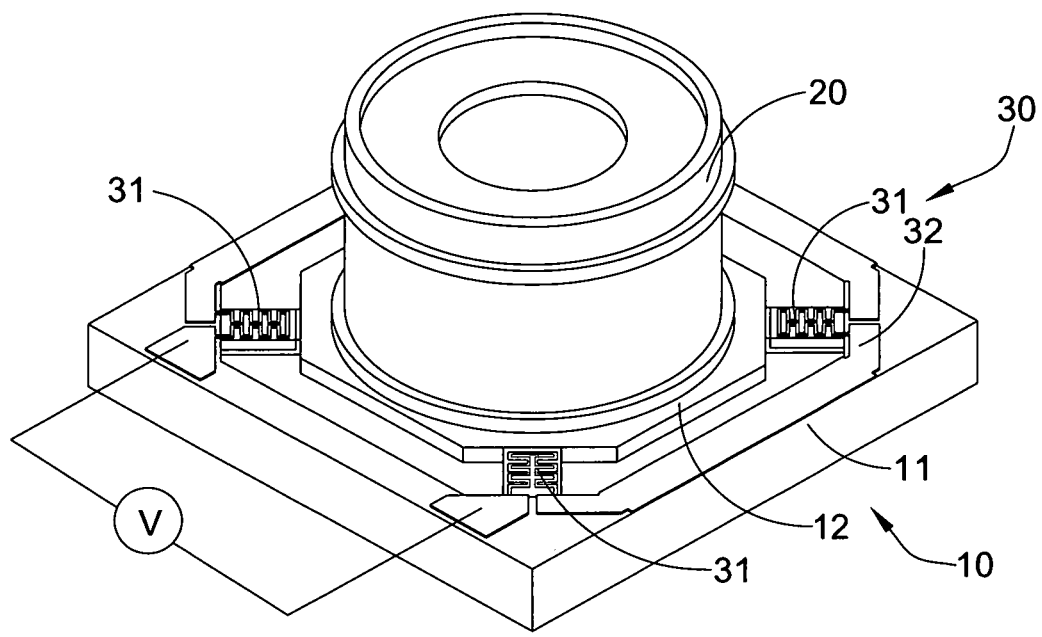
FIG. 2 is a MEMS system mounted with a lens barrel according to a preferred embodiment of the present invention.
Figure 3:
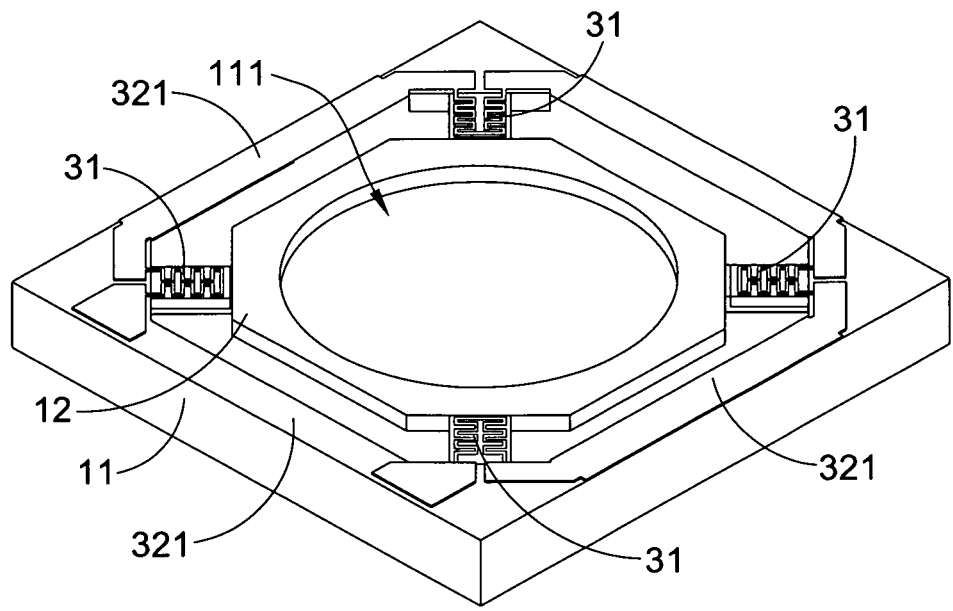
FIG. 3 is a perspective view of the MEMS system mounted without the lens barrel according to the above preferred embodiment of the present invention.
Figure 4:
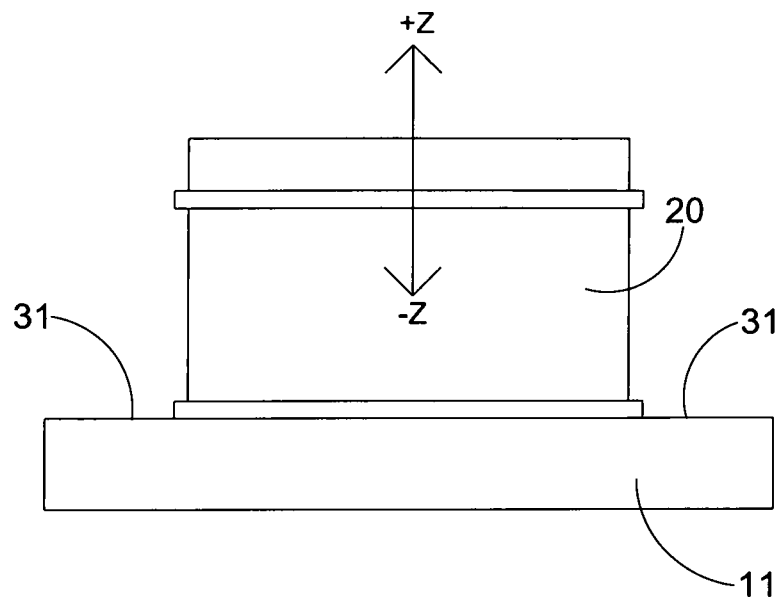
FIG. 4 is a side view of the MEMS system illustrating a Z axis of the movement of the lens barrel according to the above preferred embodiment of the present invention.
Figure 31:
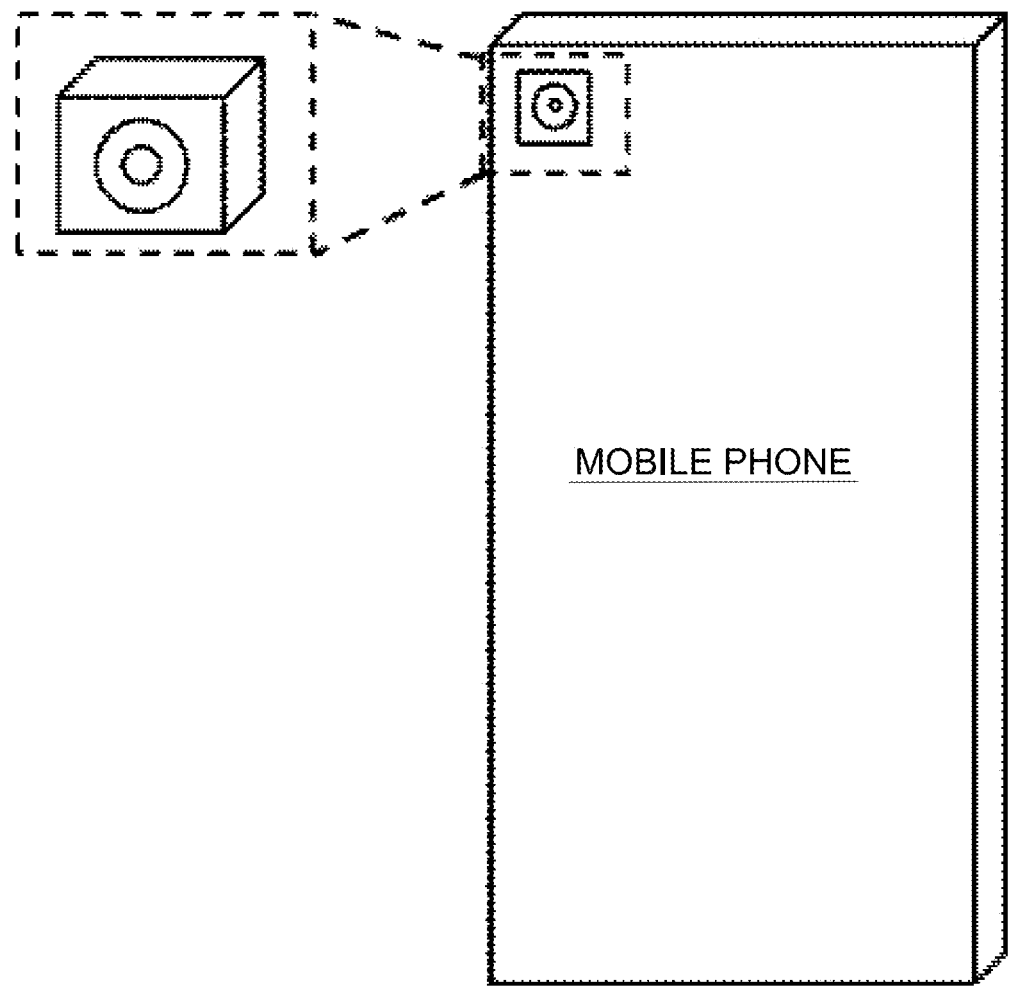
FIG. 31 illustrates the camera module installed into a mobile phone for autofocus according the above preferred embodiments of the present invention.

Referring to FIG. 31 of the drawings, a camera module of the present invention is arranged for installing into a portable electronic device, such as a smart phone, to provide an autofocus feature of the camera module. It is appreciated that the present invention can be incorporated with different portable electronic devices, such as a portable computer or a tablet computer. As shown in FIGS. 2 to 4, a preferred embodiment of the camera module according to present invention is illustrated, wherein the camera module comprises a base 10 adapted for mounting to the portable electronic device, a lens barrel 20 supporting one or more optical lens therein and adapted for movement along a Z axis, and a lens barrel positioning device 30 for selectively adjusting the position of the lens barrel 20 to achieve the autofocus feature.

The lens barrel positioning device 30 comprises two or more micro actuators 31 and a control unit 32. The micro actuators 31 are operatively linked between the base 10 and the lens barrel 20 at a position that the micro actuators 31 are radially extended from the lens barrel 20, wherein each of the micro actuators 31 is configured bendable in response to thermal energy. The control unit 32 comprises at least a heater circuit 321 operatively linked to the micro actuators 31 to controllably apply thermal energy to each of the micro actuators, wherein each of the micro actuators is bent correspondingly in responsive to thermal energy applied to move the lens barrel with respect to the base so as to control a 3-axis positioning of the lens barrel 20.

In one embodiment, the present invention is constructed to include a supporting frame 11 of the base 10, and a stage 12 of the base 10 for holding the lens barrel 20, an integrated heater of the heater circuit 321, and the thermal micro actuators 31 (thermal bimorphs) as shown in FIG. 3.

In one embodiment, the supporting frame 11 is a frame having four opposing corner portions. In particular, the frame 11 has a frame cavity 111 preferably formed at a center portion thereof. Accordingly, the lens barrel 20 is arranged to support one or more optical lens therein. Preferably, the optical lens can be stationary fixed inside the lens barrel 20, such that light beam can pass through the lens barrel 20 and penetrate through the optical lens therein.

The micro actuators 31 are aimed to replace Voice Coil Motor that is widely used in smartphones for camera autofocus. A series of design analysis and experimental validation are planned to optimize the actuator design for the autofocus application. MEMS actuator prototypes are realized by means of SU8 lithography and deep silicon etching.

Figure 5:
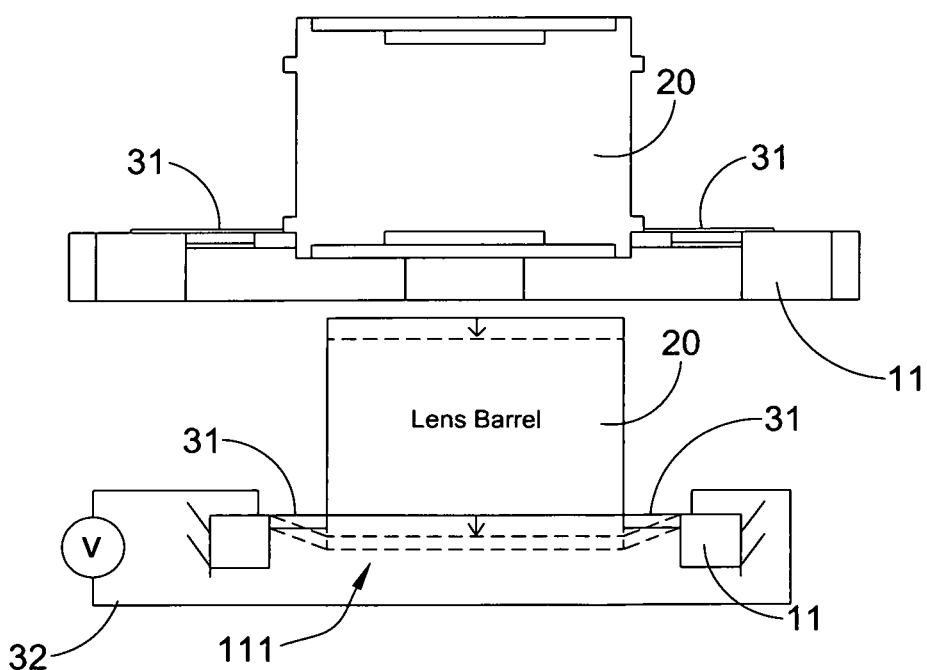
FIG. 5 illustrates movement of the lens barrel when the thermal MEMS actuators are powered according to the above preferred embodiment of the present invention.

The micro actuators 31 are symmetrically located around the lens barrel 20. In one embodiment, there are four micro actuators 31 provided at the four corner portions of the frame 11. In other words, the thermal micro actuators 31 (thermal unimorphs) are preferably located at four corner of the frame 11 in this embodiment, as shown in FIG. 3, at a position around the circumferential edge of the frame cavity 111. The lens barrel 20 is mounted on the stage 12 of the base 10. The lens barrel 20 moves together with the thermal microactuators 31, which bend out of plane when they are activated by resistive heating as shown in FIG. 5. The rigid frame 11 that forms the base 10 is made of single crystal silicon as shown in FIGS. 2 and 3. It serves as a heat sink for the thermal micro-actuators 31 and a holder of the device of the present invention.

Accordingly, the frame 11 is the base where the microactuators 31 and the integrated circuit of the control unit 32 are connected. The central stage 12 is disposed within the frame cavity 111 and is connected to the frame 11 by the micro-actuators 31. The stage 12 moves (out of plane) when thermal energy is supplied to the micro actuators 31. The lens barrel 20 is mounted on the central stage 12 for positioning. The integrated circuit of the control unit 32 incorporates resistive heaters for providing the thermal energy required for the thermal micro-actuators 31 to work.

It may connect all the micro-actuators 31 on the device in a single circuit so they can all be driven simultaneously with a single input. In other words, by controlling the thermal energy to apply to the micro actuators 31, the micro actuators 31 are controllably bent to move the lens barrel 20 at the frame cavity 11 through the stage 12 along a photosensitive path of a photosensitive sensor mounted on the frame 11 of the camera module.

Location of the multiple micro actuators 31 is also important. Locating the multiple micro actuators 31 in a symmetry manner helps reduce the off-axis movement such as tilting, achieving a rectilinear motion of the lens barrel 20. Preferably, three micro actuators 31 are basically required for proper positioning of the lens barrel 20 as three points are preferred for defining a plane. According to this preferred embodiment, the device provides four micro actuators 31 located at four opposing corner portions of the frame 11 symmetrically, which exploits the space to enable a compact design.

As shown in FIGS. 6 to 10, each micro actuator 31 comprises comb-shape silicon micro fins 311 and polymeric thermal expanders 312 that fill in the fin gaps 310. Activation of the micro actuators 31 is by resistive heating through an integrated micro heater 313. Preferably, the polymeric thermal expander 312 is thermally expandable polymer. Each of the micro actuators 31 further comprises a backbone 314 coupled at one side of each of the micro fins 311, wherein the micro heater 313 is provided on an opposed side of each of the micro fins 311 to operatively link to the heater circuit 321. Polymeric thermal expansion 312 bends the silicon backbone 314, while widening the silicon fin gaps 310. The difference in thermal expansion between the actuator backbone 314 and the constrained polymer composite of the polymeric thermal expansion 312 builds thermal stresses in the micro actuator 31, causing it to bend downwards, –Z axis, as shown in FIG. 11.

Figure 6:
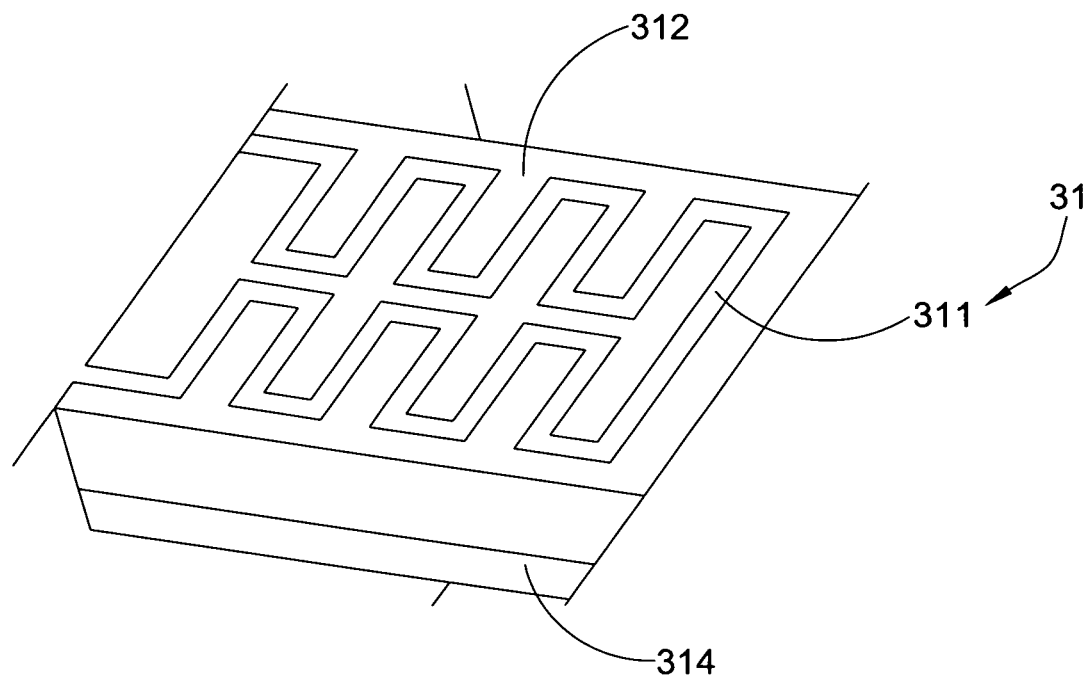
FIG. 6 is a perspective view of the thermal micro actuator according to the above preferred embodiment of the present invention.
Figure 7:
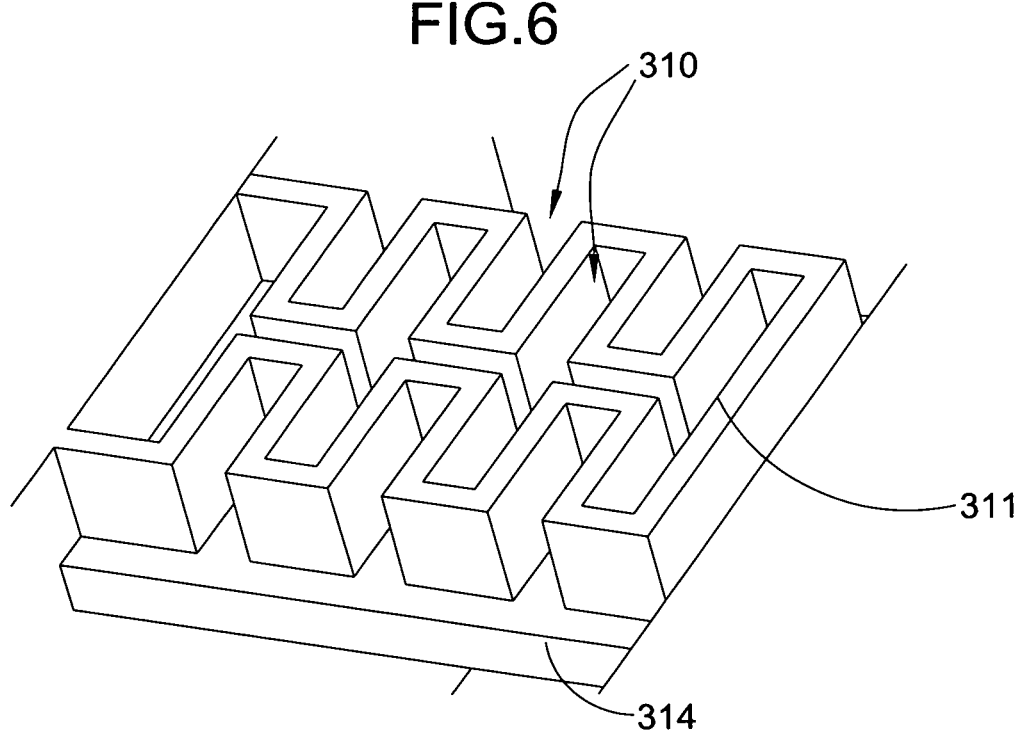
FIG. 7 is a perspective view of the micro fins according to the above preferred embodiment of the present invention, illustrating the meander-shape micro fins with gaps for polymer filling.
Figure 8:
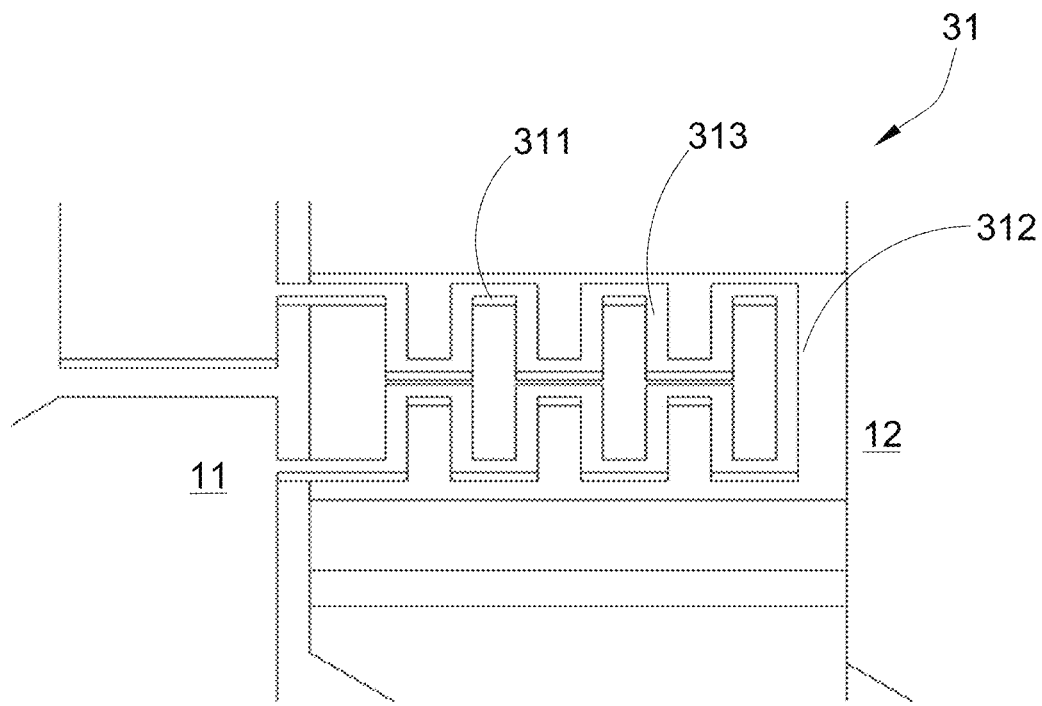
FIG. 8 illustrates the micro heater positioned on top of the micro fin according to the above preferred embodiment of the present invention.
Figure 9:
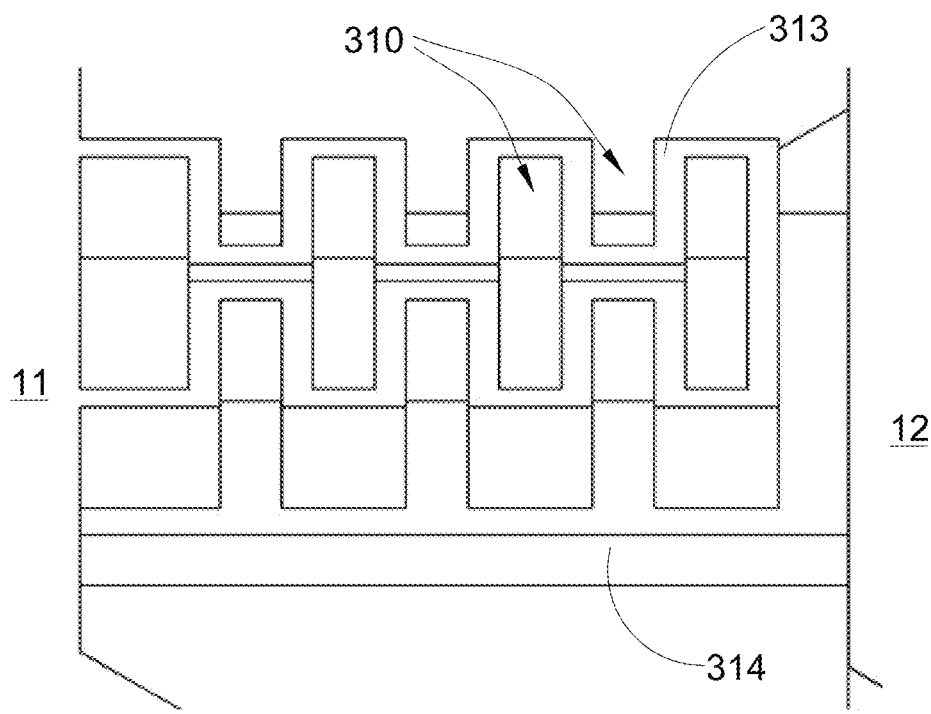
FIG. 9 illustrates the meander skeleton with gaps for polymer filling according to the above preferred embodiment of the present invention.
Figure 11:
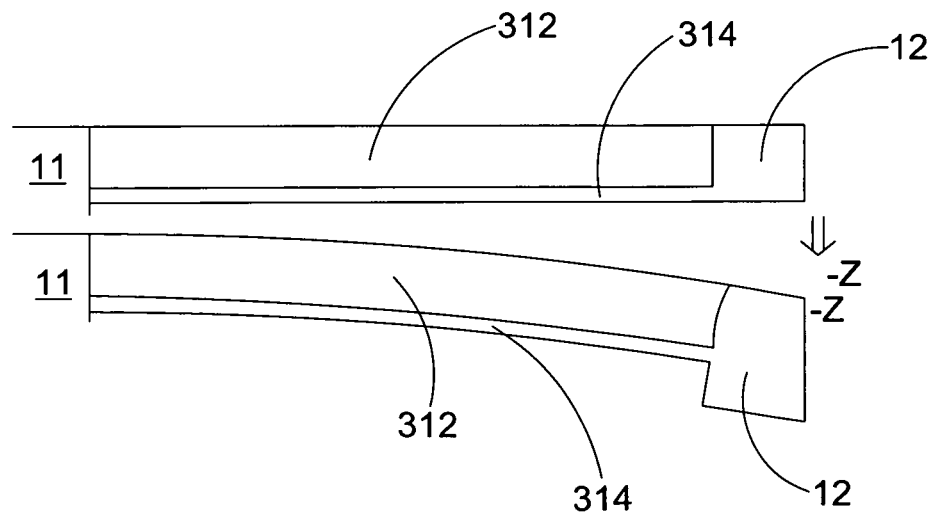
FIG. 11 illustrates the bending motion of the thermal micro actuator according to the above preferred embodiment of the present invention.
Figure 12:
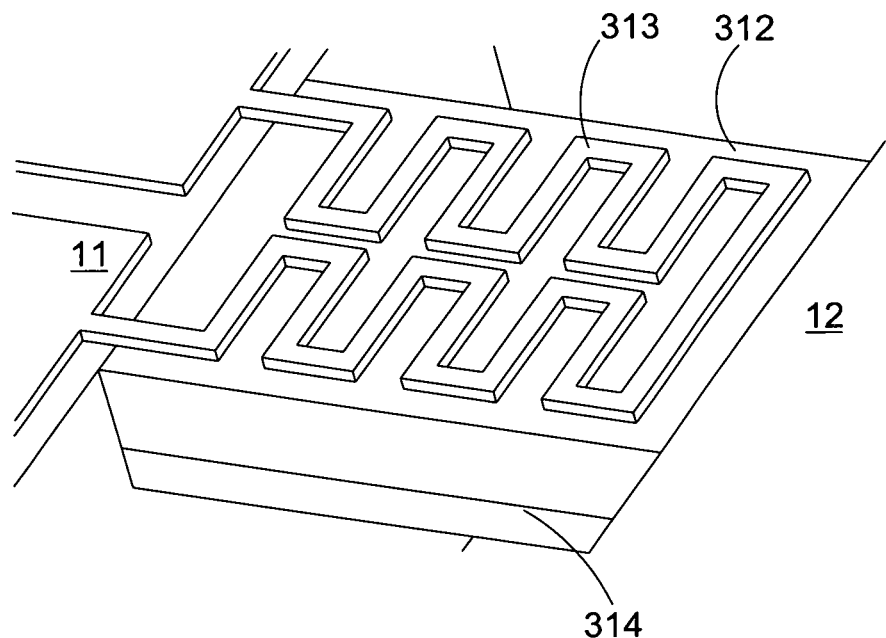
FIG. 12 is a perspective view of the micro-heater on the thermal micro-actuator according to the above preferred embodiment of the present invention.

Referring to FIGS. 6 to 10, the micro fins 311 in the meander shape serve as a heat conductor between the micro heater 313 and the thermal expander 312 in each micro actuator 31. Each of the micro fins 311 further serves as an actuating beam extended between the frame 11 and the stage 12. It also serves as a planar constraint on the thermal expander 312 (i.e. thermally expandable polymer as shown in FIG. 6) to concentrate the volumetric thermal expansion in the actuation direction. In other words, when electrical power is supplied, the thermal expander 312 will expand upon heating. The difference in expansion between the actuator backbone 314 and the constrained polymer 312 builds thermal stresses in the micro actuators 31, causing to bend downwards towards the base 10 along the Z axis, as shown in FIG. 11. The micro actuators 31 are positioned in symmetry that helps to offset any off-axis movement, moving the stage in a rectilinear motion. This minimizes the lens barrel tilting. The backbone 314 to the micro fins 311 serves as the base structure, acting like a rigid layer in the bilayer actuator. In addition, the backbone 314 acts well fast heat transfer, connecting each fin plates of the micro fins 311 as shown in FIG. 12. This design of silicon micro fins 311 helps the device achieving fast response time (generally 10-40 ms). The micro heater 313 runs along the meander skeleton of the bending thermal micro actuator 31. The meandered skeleton serves both as a heat transfer medium and as a constraint on the thermally expandable polymer of the polymeric thermal expander 312 that is filled in the fin gaps 310.

FIGS. 10(A) to (D) illustrate different designs of the micro fin 311, serving as actuating beam extending between the frame 11 and the stage 12, which differs in length of the thin film heater and/or the silicon micro structure. According to the preferred embodiment of the present invention, the micro actuator 31 is embodied as a thermally driven Si/Su-8 composite micro actuator, which offers autofocus and antishake functions for the camera module for portable electronic device, wherein the actuating beam connects to a circular silicon (Si) stage, on which a carrier and the lens barrel 20 is attached. Each of the actuating beams embodies a meandered silicon plate, SU-8 which is filled between the meandered structures and a platinum thin-film heater. Owing to its superior thermal conductivity, silicon plates can efficiently transfer heat to the sandwich SU-8. Due to constraint of silicon backbone, Si/SU-8 actuating beam can only generate out-of-plane bending when the Si-SU-8 composite is resistively heated by the platinum thin-film heater, wherein simultaneous activation of the four Si/SU-8 actuating beams (micro actuators) can bend circular silicon stage in −Z direction (as shown in FIG. 11).

Figures 10A, 10B, 10C, 10D:
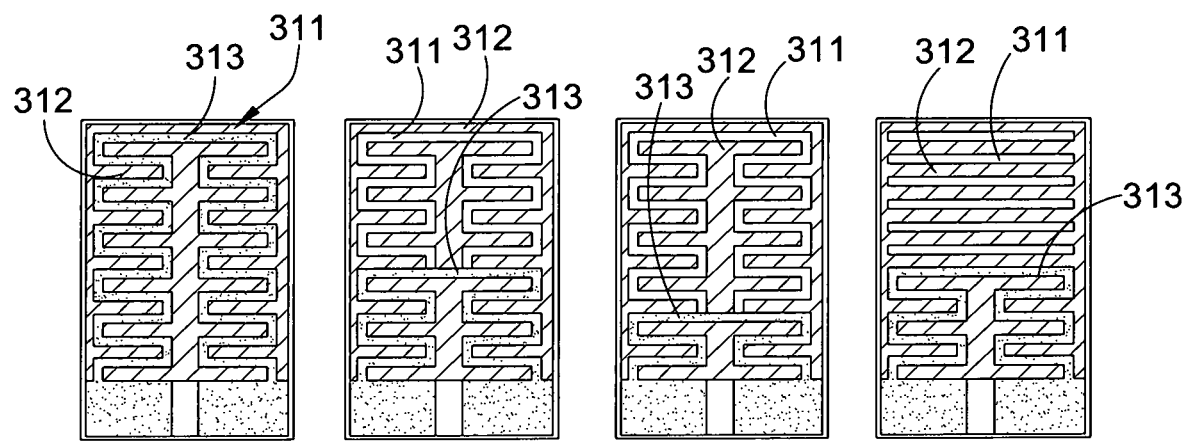
FIGS. 10A to 10D illustrates different designs of the micro fin according to the above preferred embodiment of the present invention.
Figure 13:
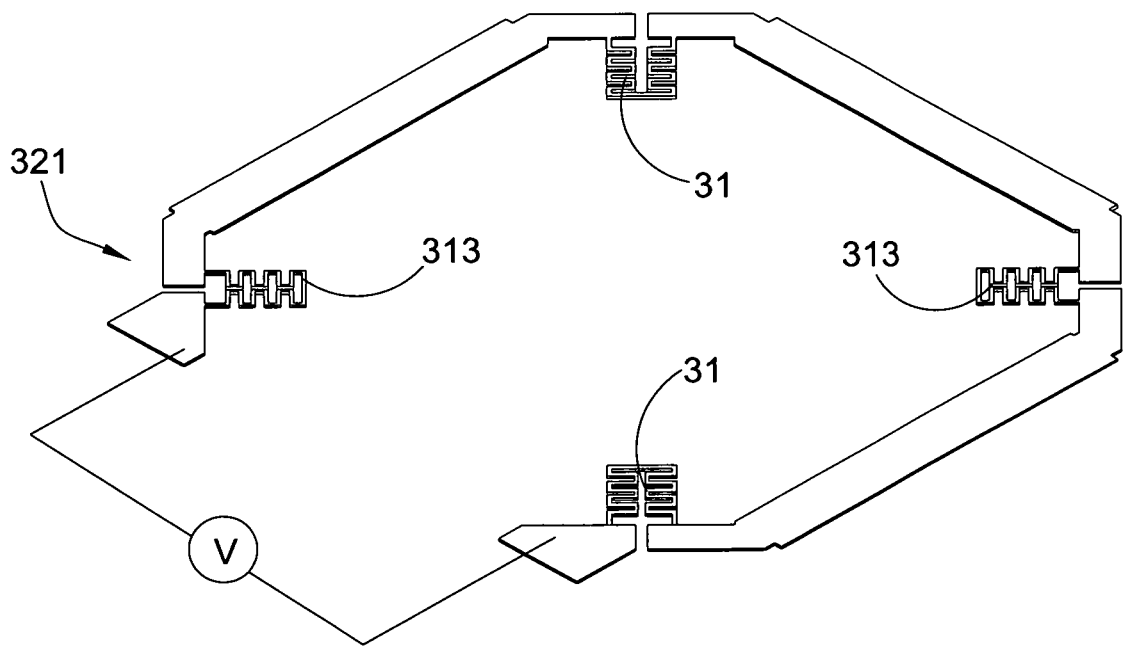
FIG. 13 illustrates an integrated heater circuit according to the above preferred embodiment of the present invention.

FIG. 10(A) shows a meandered shape of the micro fin 311. FIG. 10(B) shows a double-meandered shape of the micro fin 311. FIG. 10(C) shows a triple-meandered shape of the micro fin 311. FIG. 10(D) shows a half-meandered/half-parallel combination of the micro fin 311. In other words, FIGS. 10(A) to (C) show top view of silicon meandered structure with full-length, half-length and one-third-length of thin film heater, respectively, while FIG. 10(D) shows half of the silicon beam is formed by meandered structure with heater on top and another half is formed by parallel silicon plates. For example, when a width of the silicon meandered plates $SP_{width}$ is embodied as 5 μm and a gap between the meandered plates $SP_{gap}$ is embodied as 10 μm, simulation results shows that the triple meandered design with one-third-length of heater that gives the most homogeneous heating across the whole actuating beam, which generates largest displacement if dimensions of the actuating beam are fixed in the FEM simulation. As shown in the following table illustrating the performance of various Si/SU-8 actuating beams with different length and/or heater length, there would be twelve designs with different lengths (width and thickness are fixed at 415 μm and 15 μm, respectively) and/or heater length for the actuating beam on the mask design:

single circuit of the control unit 32 for simultaneous control with a single input, as shown FIG. 13. Preferably, the micro heater 313 is a platinum thin-film heater. It is worth mentioning that the meander shaped micro fins 311 increase the contacting surface area for the micro heater 313 to apply the heat therefrom and increase the thermal conductive area between the backbone 314 and the polymeric thermal expander 312 for heat transfer.

According to this preferred embodiment, the design of each of the micro actuators 31 is to have a footprint of 9.28 mm×9.28 mm×0.5 mm (wafer thickness). The micro actuators 31 consist of four thermally actuated beams connecting to a circular silicon (Si) stage with diameter of 6.78 mm, on which a stage 12 and lens barrel 20 is attached. It is noted that grooves are etched out in the circular silicon stage 12 to maximize actuation in the Z direction, along the photosensitive path of the photosensitive sensor. As can be seen from the isometric view, each of the actuating beams of the micro actuators 31 embodies meandered silicon plates, SU-8 which is filled between the meandered structures and a platinum thin-film heater. Owing to its superior thermal conductivity, silicon plates of the micro fins 311 can efficiently transfer heat to the sandwiched polymeric thermal expander 312. Due to constraint of silicon backbone 314, micro actuators 31 can only generate out-of-plane bending when the thermal expander 312 is resistively heated by the platinum thin-film heater 313. Simultaneous activation of the four micro actuators 31 can bend circular silicon stage 12 in the Z direction, as shown in FIG. 12, which in turn moves down the whole carrier of the stage 12 and lens barrel 20 to carry out autofocus function.

Many types of bendable thermal micro actuators 31, such as bimetals or thermal bilayers, can be used in this out-of-plane positioning system. The suitable one needs to respond fast a lower power requirement, not more than the power input to a VCM. The thermal micro actuator 31 is chosen due to its large stroke and fast response. In addition, the micro actuator 31 is capable of operating without requiring excessive heating which adversely affects the image quality.

Current design utilizes MicroChem SU-8 resin as the filled polymer of the thermal expander 312. SU-8 has a high coefficient of thermal expansion (50-150 ppm/° C.), a

| | Micro-Fin Design | | | | | | | | | | | |
|---|---|---|---|---|---|---|---|---|---|---|---|---|
| | Full Meandered | | | Double-meandered | | | Triple-meandered | | | Half-meandered/ parallel plate | | |
| Length (μm) | 830 | 1040 | 1220 | 810 | 1050 | 1230 | 855 | 1035 | 1215 | 825 | 1065 | 1245 |
| Stroke (μm) at 48 V | 115 | 123 | 128 | 171 | 199 | 218 | 203 | 231 | 258 | 172 | 199 | 218 |
| Stiffness, K (N/m) | 34.6 | 23.3 | 17.3 | 36.1 | 23 | 17.1 | 33 | 23.6 | 17.5 | 34.8 | 22.3 | 16.6 |
| Response time (ms) | 20 | 27.5 | 37.5 | 20 | 27.5 | 37.5 | 20 | 27.5 | 37.5 | 20 | 30 | 37.5 |

$SP_{width}$ = 5 μm
$SP_{gap}$ = 10 μm
$T_1$ = 10 μm
$T_2$ = 5 μm

Referring to FIG. 12, the integrated micro heater 313 comprises at least an electrically conductive metal thin film in a meander shape to match with the shape of the micro fins 311 and to couple on the micro fins 311, wherein it has a high resistance and is stable at high temperatures. It generates heat when an electrical current passes therethrough. In this embodiment, all the micro heaters 313 are connected in a Young's modulus (3 GPa), and Poisson's ratio (0.3). The ideal thermally expandable polymer 312 to make the thermal bimorph should have a higher coefficient of thermal expansion (>150 ppm/° C.) and young modulus (>1 GPa). The polymeric thermal expander 312 should also be nearly incompressible (Poisson ratio from 0.49 to 0.5) to maximize the thermal stress and strain in the actuation direction.

Typical polymers that fit this range are silicone based resins (Dow Corning WL-5150 photo-patternable silicon).

Figure 34:
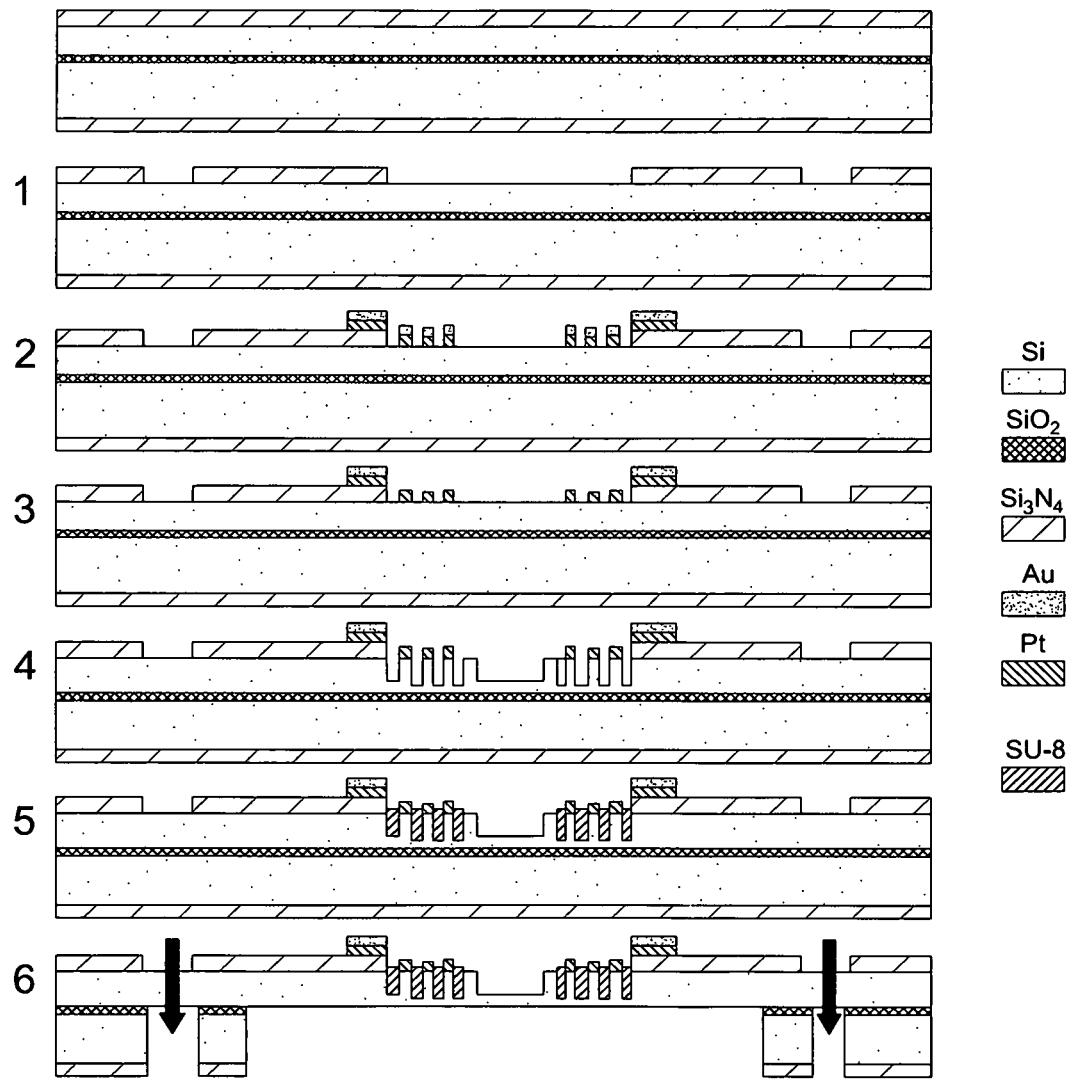
FIG. 34 illustrates the fabrication process of the micro actuator according to the above preferred embodiment of the present invention.

Referring to FIG. 34, the micro actuators 31 embodied as Si/SU-8 micro actuator is fabricated of MEMS actuator requiring six masks, wherein the first and the third masks are the same kind of mask. The fabricating method of the micro actuator 31 comprises the following steps:

(Step 1) Deposit a layer of 100 nm-thick $Si_3N_4$ on both sides of the SOI (Silicon On Insulator) wafers, wherein the $Si_3N_4$ on the front side is patterned by photolithography and pasta etching using $CF_4$ and the etched areas on the top side of the substrate are reserved for Si stating for actuating beam structure.

(Step 2) Sputter 20 nm of Ti onto the resist-patterned top side of the substrate followed by 200 nm of Pt and 80 nm of Au, wherein the final heater patterns are obtained after removing the photoresist in the lift-off process.

(Step 3) Utilize the mask in Step 1 to cover the bond pad areas so that the Au layer on the Pt thin film heater can be removed.

(Step 4) Fabricate Si microstructure (both meandered an parallel plate) by deep reactive-ion etching (DRIE), wherein the etching is carried out on the device layer until desired thickness is achieved.

(Step 5) Mold SU-8 resist into the gaps between the etched Si microstructure in order to form the Si/SU-8 composite, wherein after Si microstructure is filled with SU-8, it is patterned by standard photolithography.

(Step 6) Pattern $Si_3N_4$ on back side by photolithography and plasma etching using $CF_4$, wherein bottom cavities on the substrate are created by DRIE.

(Step 7) Release MEMS actuators by etching buried oxide layer either using wet HF etching or plasma etching using $CF_4$.

(Step 8) Hard bake the processed substrate on a hot plate at 120° C. for 1 hour and separate individual die of MEMS micro actuator from the wafer by mechanically breaking (arrow sign in FIG. 34) the supporting actuating beams.

Figure 14:
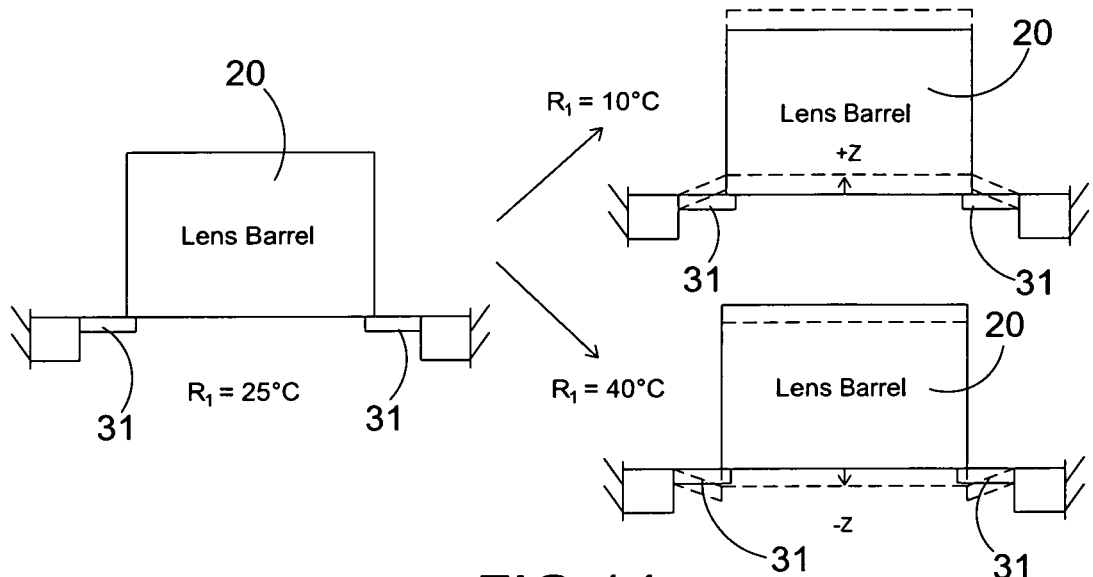
FIG. 14 illustrates the neutral position (at zero voltage) of the lens barrel being drifted with ambient temperature changes according to the above preferred embodiment of the present invention.

It is worth mentioning that the tip position of each micro actuator 31 (thermal bimorphs) depends on the ambient temperature. As a result, the neutral position of the position stage (at zero voltage) of the lens barrel 20 varies with the ambient temperature, as shown in FIG. 14. Without a definite reference starting point, this temperature-dependent drifting of the stage position makes the system without a reference for positioning control.

Thermal micro actuators 31 are affected by the ambient temperature. This may make them unsuitable for positioning systems. The present invention will introduce two methods to make the control the device positioning, independent of ambient temperature changes.

Figure 15:
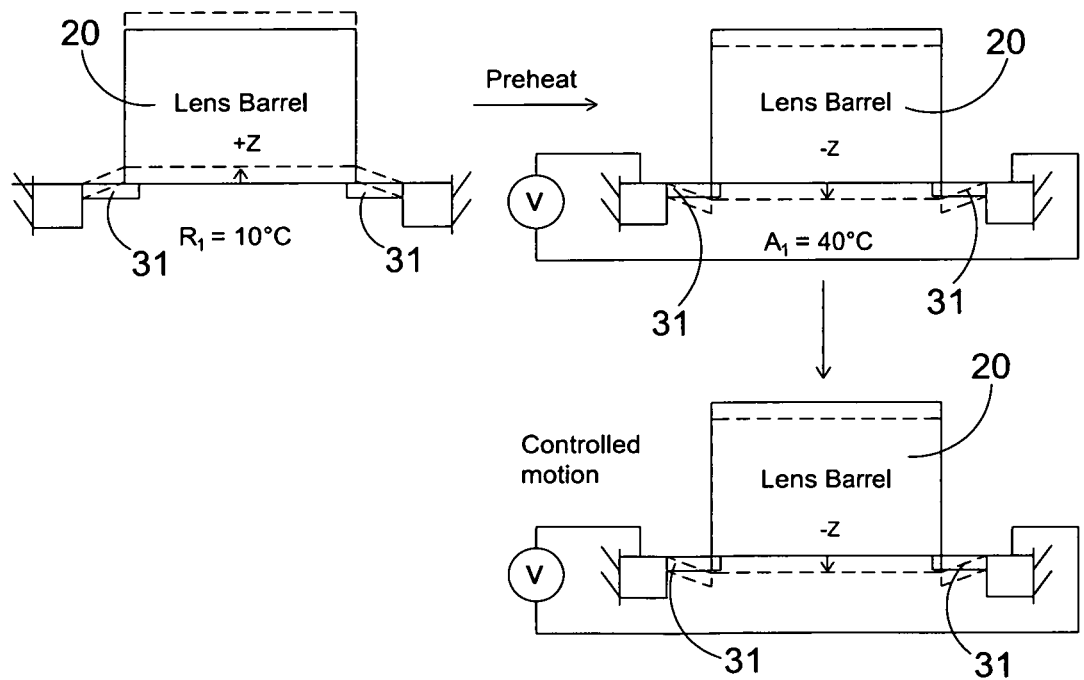
FIG. 15 illustrates preheating to get a fixed reference point of the lens barrel independent of the ambient temperature according to the above preferred embodiment of the present invention.

Referring to FIG. 15, a first method is to pre-heat the micro actuators 31 to a reference temperature point, i.e. well above the operating ambient temperatures. Heating above the reference temperature point allows the positioning control as shown in FIG. 15. In other words, the first method is to pre-heat the micro actuators 31 to the reference temperature point above most ambient temperatures prior to use. Any temperature changes from the reference temperature point are calibrated for positioning. In other words, each of the micro actuators 31 is preheated by the heater circuit 321 at the reference temperature point to calibrate the neutral position of the lens barrel 20 independently to an ambient temperature change, such that when each of the micro actuators 31 is heated by the heater circuit 321 above the reference temperature point, the micro actuator 31 is bent to move the lens barrel 20 from the neutral position thereof.

Figure 16:
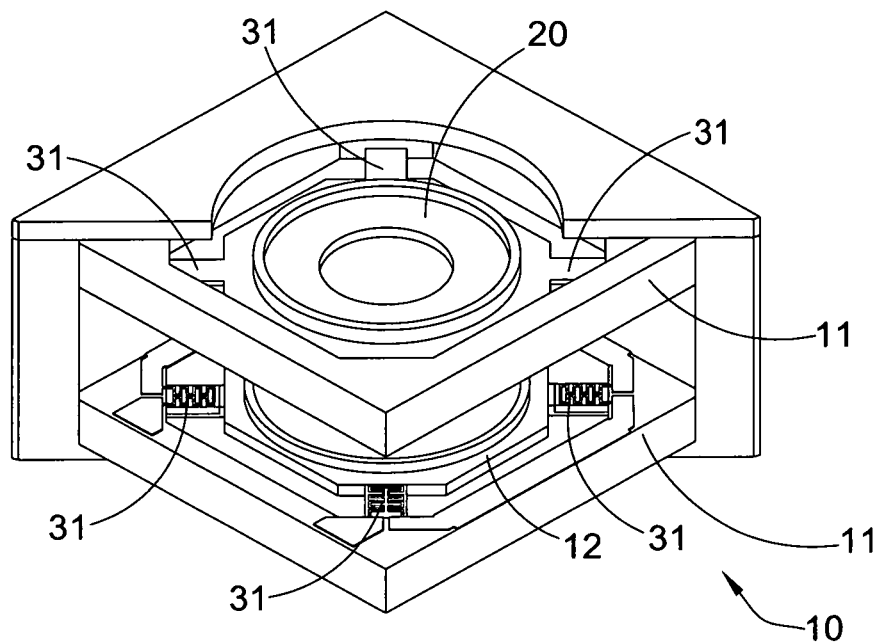
FIG. 16 is a perspective view of the differential system with two MEMS devices for the lens barrel according to the above preferred embodiment of the present invention.
Figure 17:
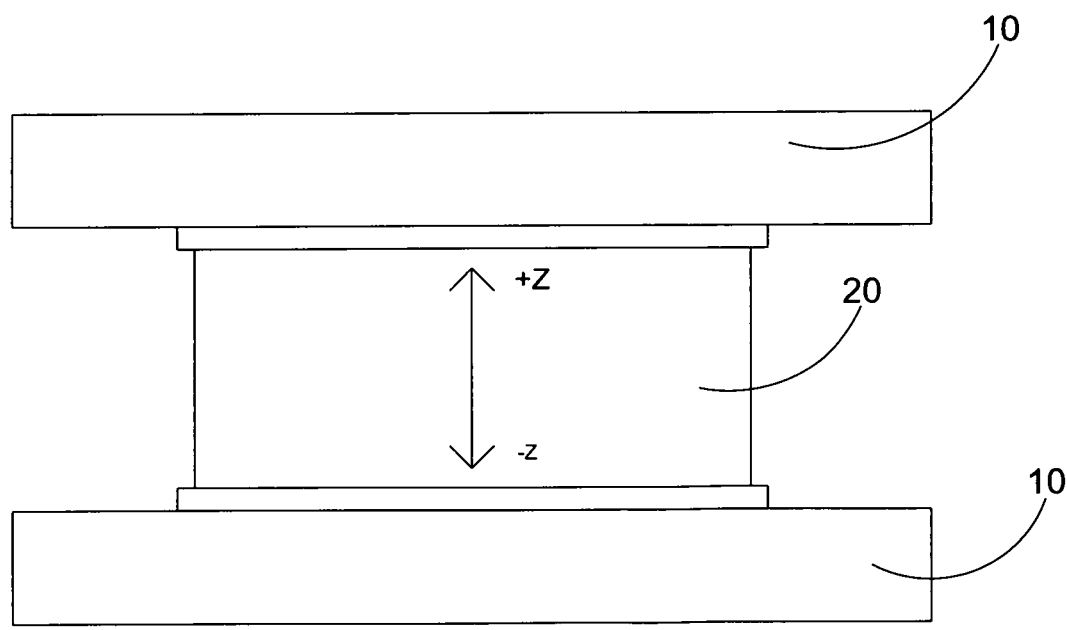
FIG. 17 is a side view of the two MEMS devices for the lens barrel according to the above preferred embodiment of the present invention.
Figure 18:
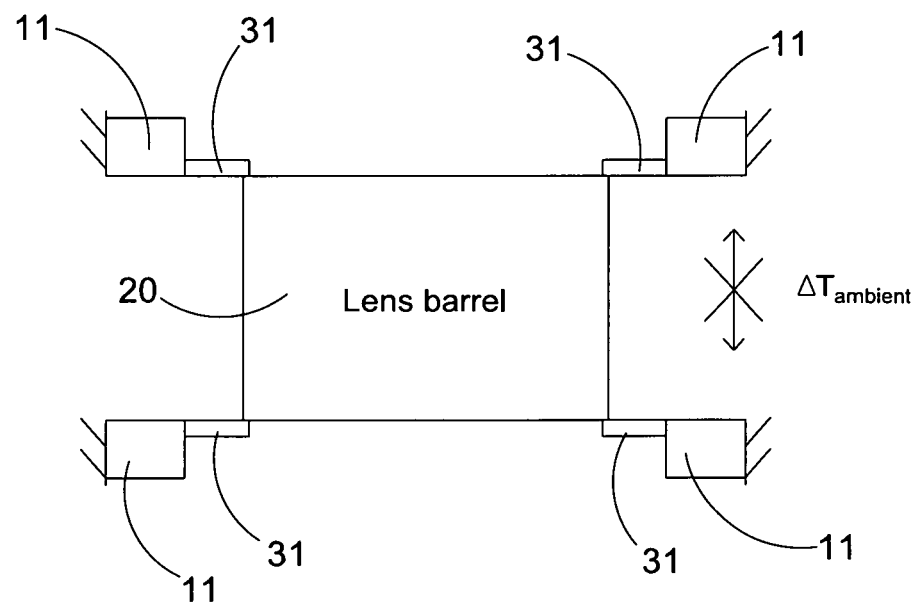
FIG. 18 illustrates the lens barrel between the two MEMS devices according to the above preferred embodiment of the present invention, illustrating the lens barrel being not moved with changes in ambient temperature due to the opposing devices.
Figure 19:
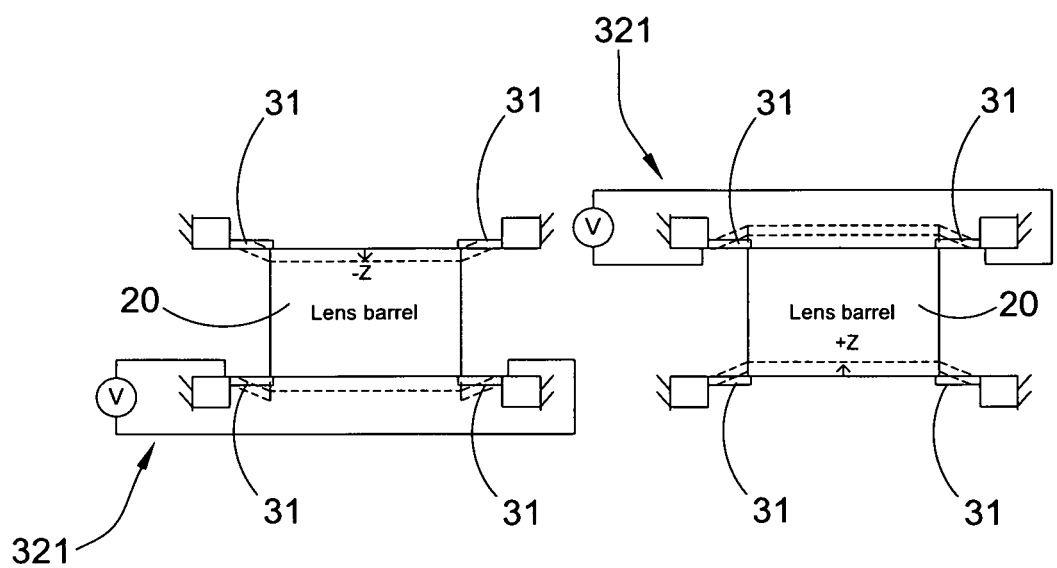
FIG. 19 illustrates the supplying power to top or bottom of the MEMS device to move the lens barrel according to the above preferred embodiment of the present invention.

A second method is based on a differential system as shown in FIGS. 16 to 18. Two sets of micro actuators 31, an upper set of micro actuators and a lower set of micro actuators, are installed in parallel and opposing with each other in the event of any ambient temperature differences as shown in FIGS. 16 to 18. Such that the lens barrel 20 will only move when there is a difference in temperature between the 2 sets of opposing micro actuators as shown in FIG. 18. In particular, the micro actuators 31 are configured to have an upper set of micro actuators 31 coupled to an upper portion of the lens barrel 20 and a lower set of micro actuators 31 coupled to a lower portion of the lens barrel 20, such that the lens barrel 20 is held at the neutral position independently to an ambient temperature change. The heater circuit 321 can be either supply power to the upper set of micro actuators 31 or the lower set of micro actuators 31 to control the motion of the lens barrel 20, as shown in FIG. 19. In other words, the position of the lens barrel 20 is balanced out to retain at the neutral position due to the ambient temperature change by generating two opposite forces from the upper set of micro actuators 31 and the lower set of micro actuators 31 respectively so as to hold the lens barrel 20 at the neutral position independently to the ambient temperature change. Any change in position of the upper set of micro actuator 31 (thus lens barrel) caused by the ambient is balanced out by opposite force exerted by the lower set of micro actuator 31. It is worth mentioning that the upper set of micro actuator 31 is extended between the upper frame 11 and the upper stage 12 while the lower set of micro actuator 31 is extended between the lower frame 11 and the lower stage 12, as shown in FIG. 16.

Preferably, the micro actuators 31 at the upper set of micro actuators are aligned with the micro actuators 31 at the lower set of micro actuators, such that the micro actuators 31 at the upper set and at the lower set of micro actuators are facing each other. Therefore, when the force is generated by the micro actuator 31 at the upper set of micro actuators via the bending motion due to the ambient temperature change, the force is generated by the micro actuator 31 at the lower set of micro actuators to offset or cancel out the force from the micro actuator 31 at the upper set of micro actuators. Preferably, a casing is provided to house the upper and lower sets of micro actuators 31.

It is worth mentioning that the lens barrel 20 moves upwards when the upper set of micro actuators 31 is activated and the lens barrel 20 moves downwards when the lower set of micro actuators 31 is activated. Each upper and lower set of micro actuators includes at least one micro actuator 31. Though the stroke in one direction is reduced by half, the entire stroke achieved is the same as the configurations with one micro actuator 31. Therefore, this two-layer or two-set configuration allows the lens barrel 20 to be placed at the central position of the entire stroke for faster autofocus. It is also structurally more stable. By activation of the upper and lower set of micro actuators 31, the lens barrel 20 can be moved up and down for autofocus purpose, respectively.

When the image to be taken is focused at the initial position of lens barrel 20, i.e. when autofocus is not required, image stabilization can be achieved by activating the micro actuators 31. Accordingly, the lens barrel 20 can be rotated along the same axis when the selected micro actuators 31 (not all the micro actuators 31) are activated.

Figure 20:
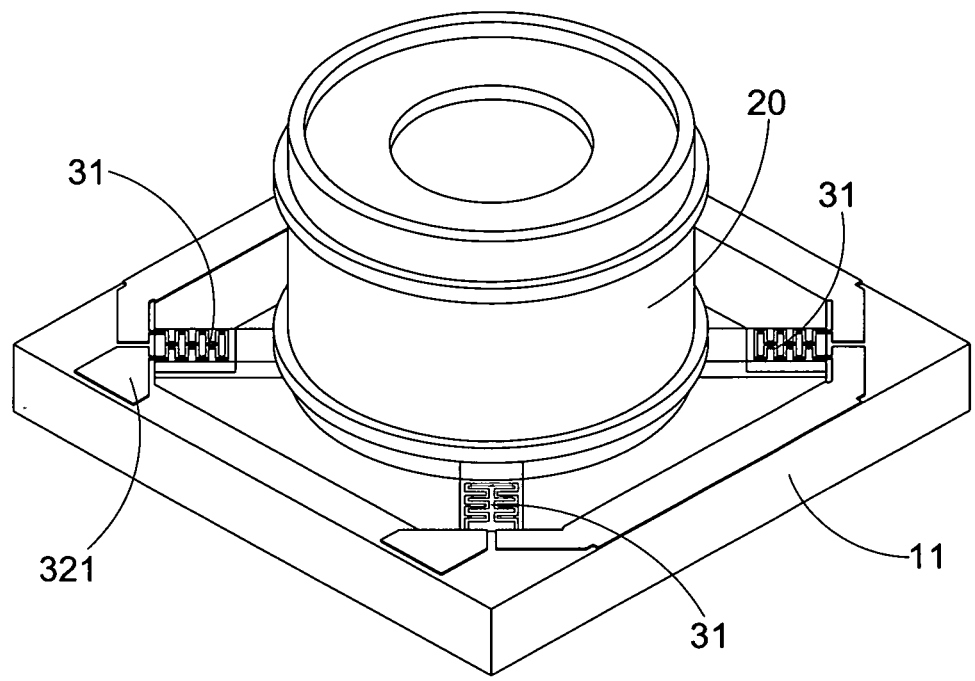
FIG. 20 is a perspective view of a MEMS system with the lens barrel according to an alternative mode of the above preferred embodiment of the present invention.
Figure 21:
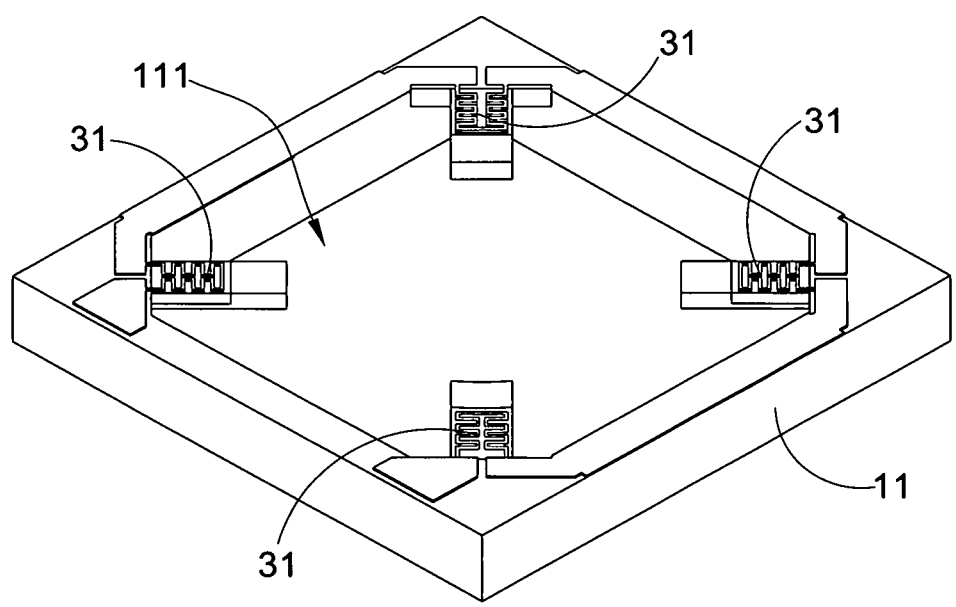
FIG. 21 is a perspective view of the MEMS system without the lens barrel according to the alternative mode of the preferred embodiment of the present invention.
Figure 22:
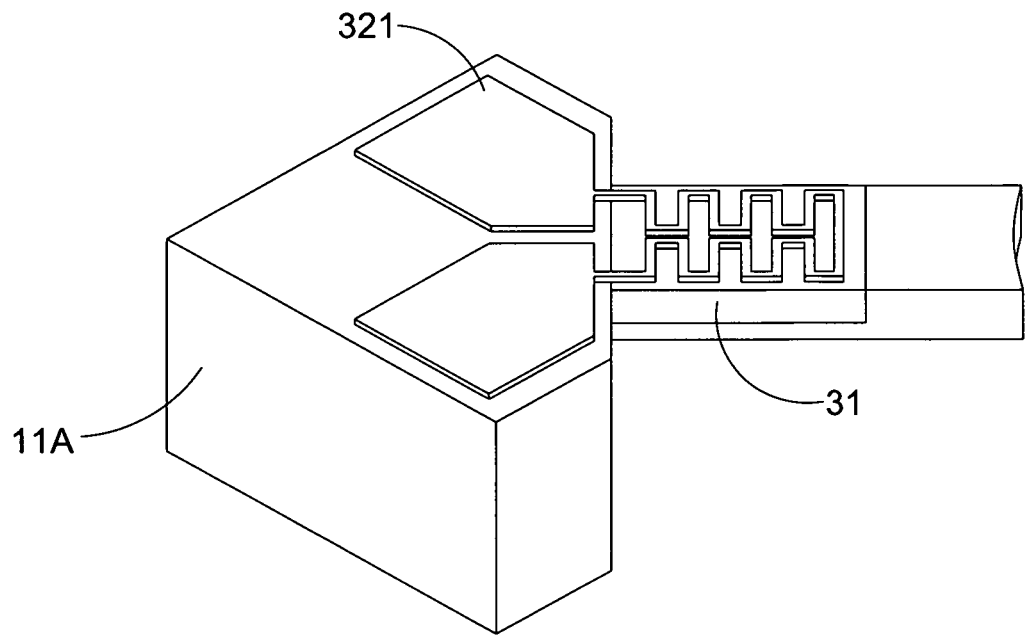
FIG. 22 illustrates an individual actuator block according to the alternative mode of the preferred embodiment of the present invention.

Referring to FIGS. 20 and 21, an alternative mode of the above preferred embodiment is illustrated, wherein an alternative mode of the base 10 is illustrated. In which, the stage 12 is removed and the lens barrel 20 is directly mounted onto the tips of the micro actuators 31 as shown in FIG. 20. The lens barrel 20 is attached to the mounting points using glue/mechanical methods as shown in FIG. 21. In other words, the micro actuators 31 are radially extended from the frame 11 to couple at a surrounding wall of the lens barrel 20 to support the lens barrel 20 at the frame cavity 111 and to move the lens barrel 20 as well.

Figure 23:
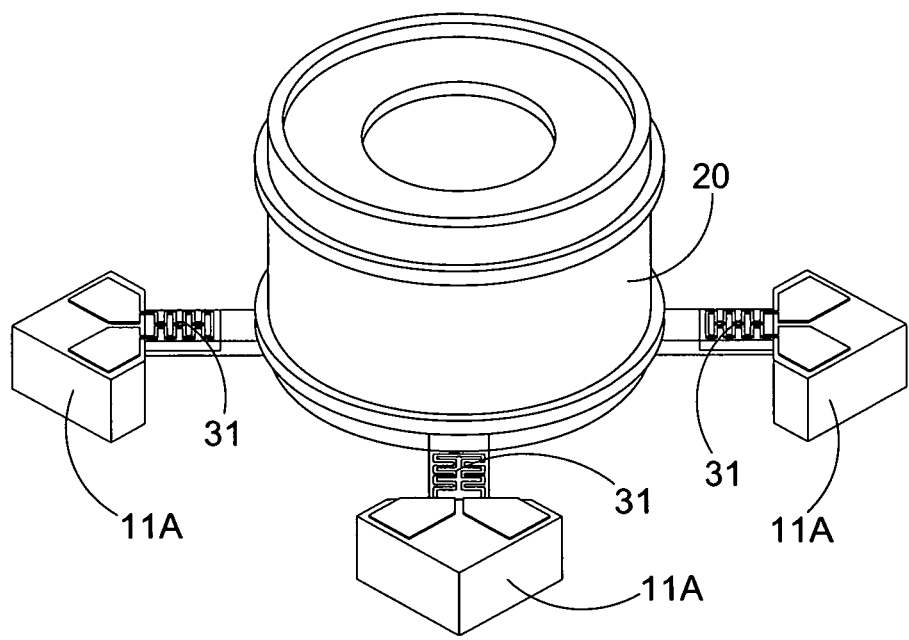
FIG. 23 illustrates the individual micro-actuator blocks for supporting the lens barrel via the micro actuators without any frame according to the alternative mode of the above preferred embodiment of the present invention.
Figure 24:
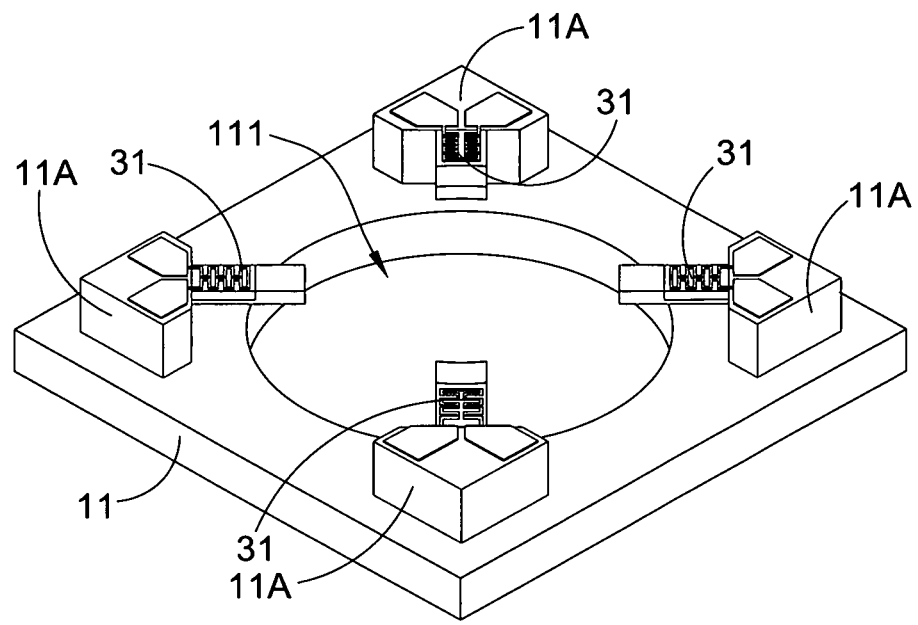
FIG. 24 illustrates the individual micro-actuator blocks on a PCB circuit for control according to the alternative mode of the above preferred embodiment of the present invention.
Figure 25:
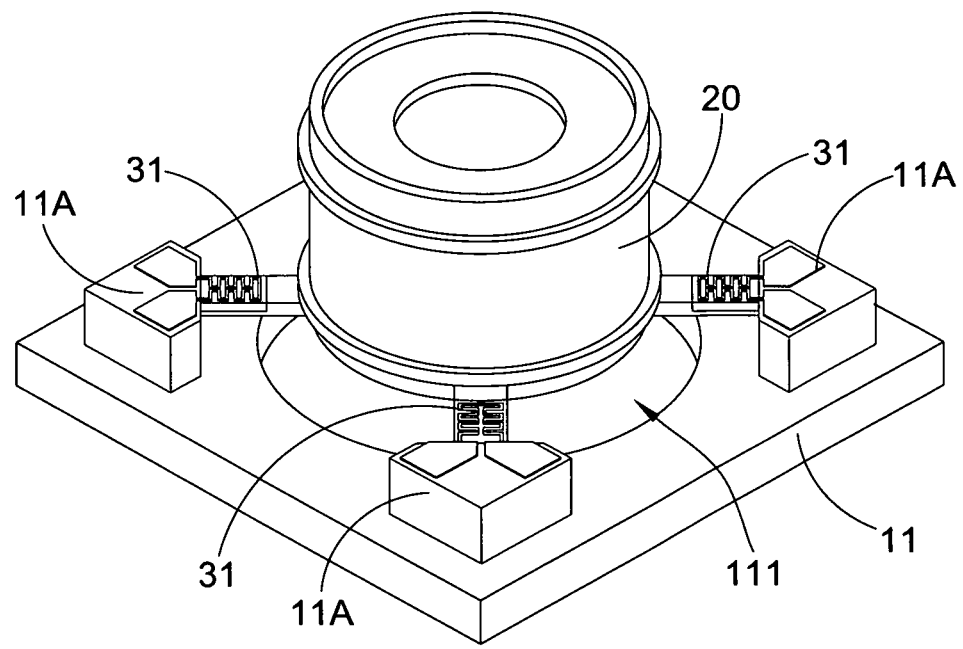
FIG. 25 illustrates a mounting of lens barrel on the thermal micro-actuators fixed on the PCB according to the alternative mode of the above preferred embodiment of the present invention.
Figure 26:
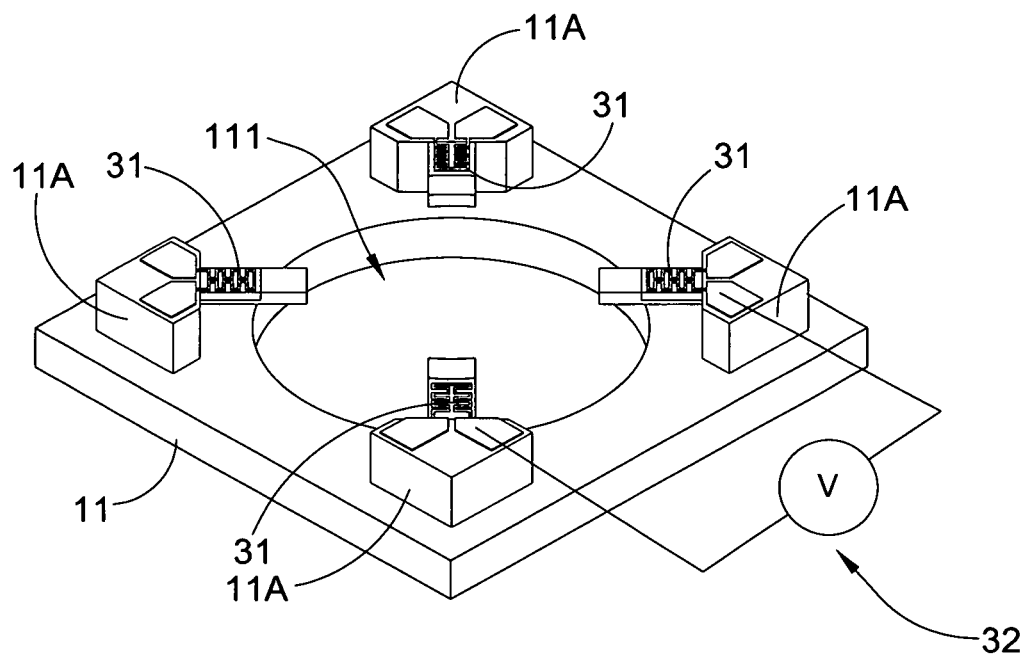
FIG. 26 illustrates an electrical circuit for simultaneous control according to the alternative mode of the above preferred embodiment of the present invention.
Figure 27:
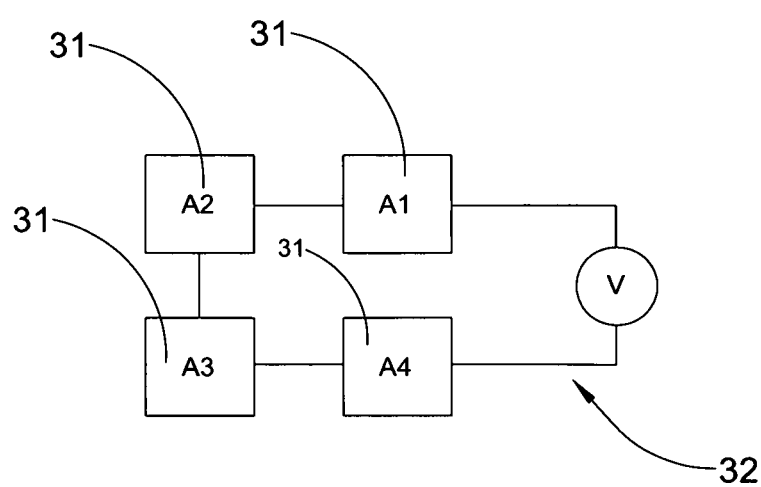
FIG. 27 illustrates a circuit diagram of the electrical circuit for simultaneous control according to the alternative mode of the above preferred embodiment of the present invention.

FIGS. 22 to 26 further illustrate another alternative mode of the base 10. The frame 11 needs not be a single monolithic piece, and it can be replaced by two or more base blocks 11A wherein each of said base blocks 11A houses a micro actuator 31 as shown in FIGS. 23 and 25. In other words, the frame 11 can be omitted and the micro actuators 31 are separated into individual base blocks 11A. Each micro actuator 31 can be controlled using an electrical circuit with a single source to achieve similar results to the basic configuration, mainly the Z axis positioning control. The individual base blocks 11A can also be mounted on the frame 11 as shown in FIGS. 24 and 25. Each micro actuator 31 can be controlled using the electrical circuit of the control unit 32 such as a printed circuit board as shown in FIGS. 26 and 27. The lens barrel 20 can be mounted using the same method as the design without the stage as shown in FIG. 25. Driving the micro actuators with a single source would achieve similar results to the basic configuration, mainly Z axis positioning control as shown in FIGS. 26 and 27.

Figure 28:
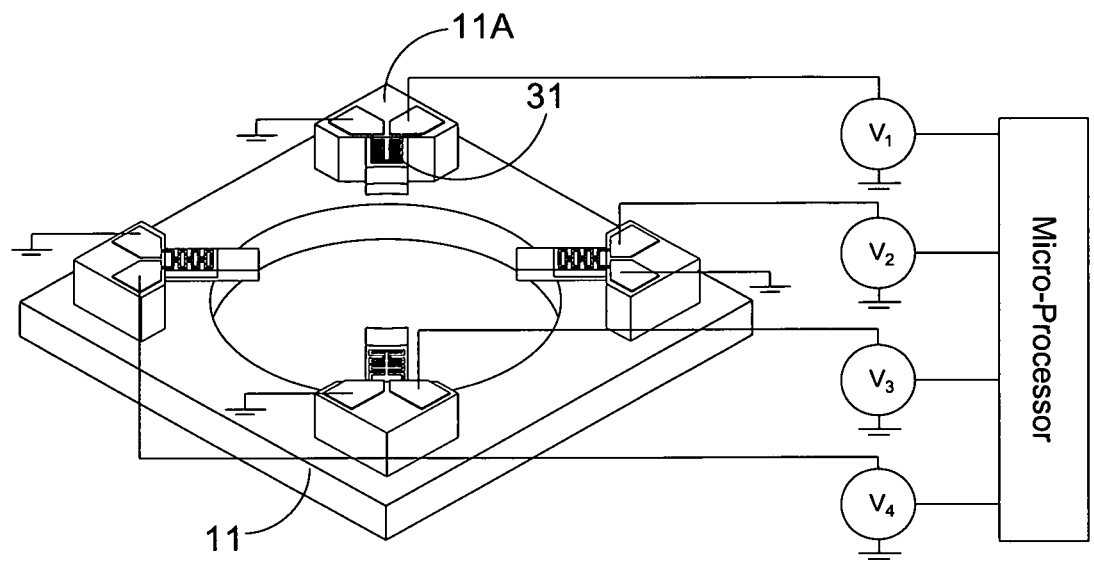
FIG. 28 illustrates an electrical circuit for separate individual movement control according to the alternative mode of the above preferred embodiment of the present invention.
Figure 29:
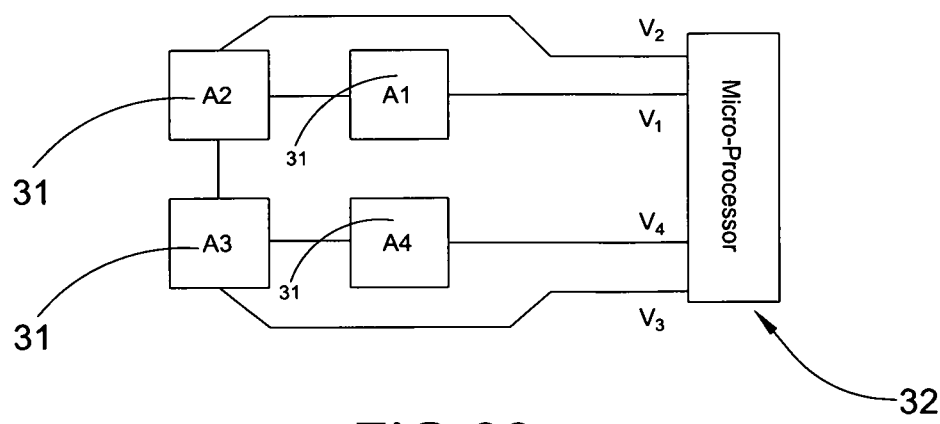
FIG. 29 illustrates a circuit diagram of the electrical circuit for separate individual movement control according to the alternative mode of the above preferred embodiment of the present invention.
Figure 30:
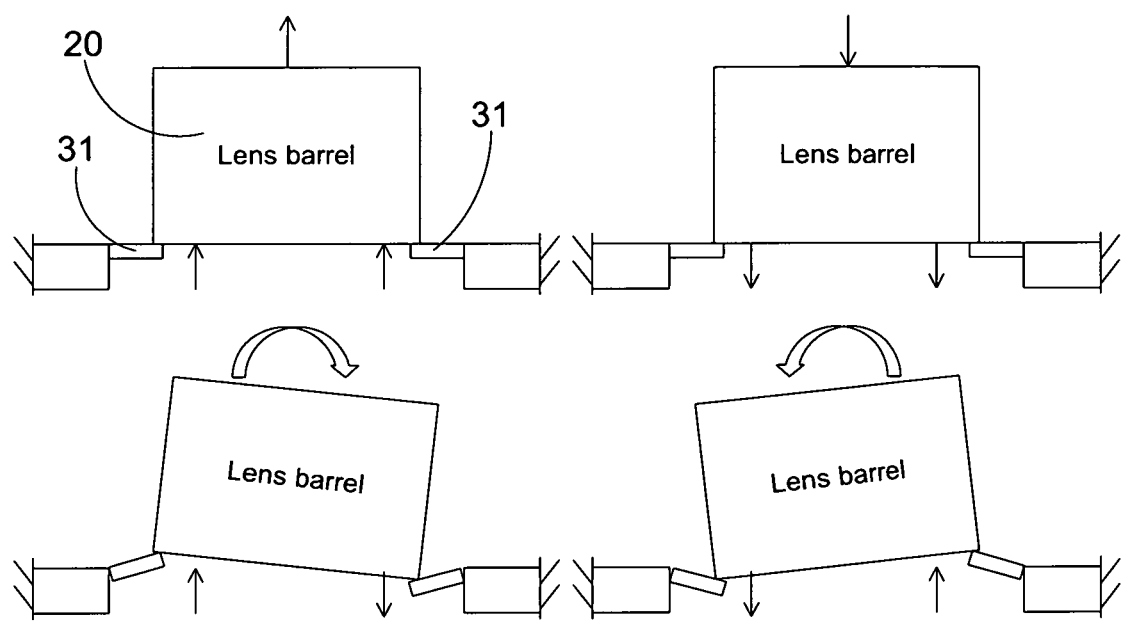
FIG. 30 illustrates control methods to achieve Z-axis and tilt control of the lens barrel according to the alternative mode of the above preferred embodiment of the present invention

Each of the individual base blocks 11A can also be controlled on an individual electrical circuit of the control unit 32 where each block 11A is controlled separately using multiple power sources and a micro-processor as shown in FIGS. 28 and 29. This allows tilting movement of the lens barrel (rotation about x and y axis) in addition to Z axis, for a total of 3-axis positioning control as shown FIG. 30.

The operation of the present invention is shown and described below. In one embodiment, four micro actuators 31 are used and assembled on four corner portions of the frame 11 and attached directly with the stage 12 or the lens barrel 20, i.e. the circular Si stage connecting the four beams is eliminated, the function of image stabilization can also be incorporated in the camera module. Each micro actuator 31 has an elongated structure to form a beam. Therefore, the micro actuators 31 with individually-controlled beams are formed for autofocus and image stabilization.

Figure 32:
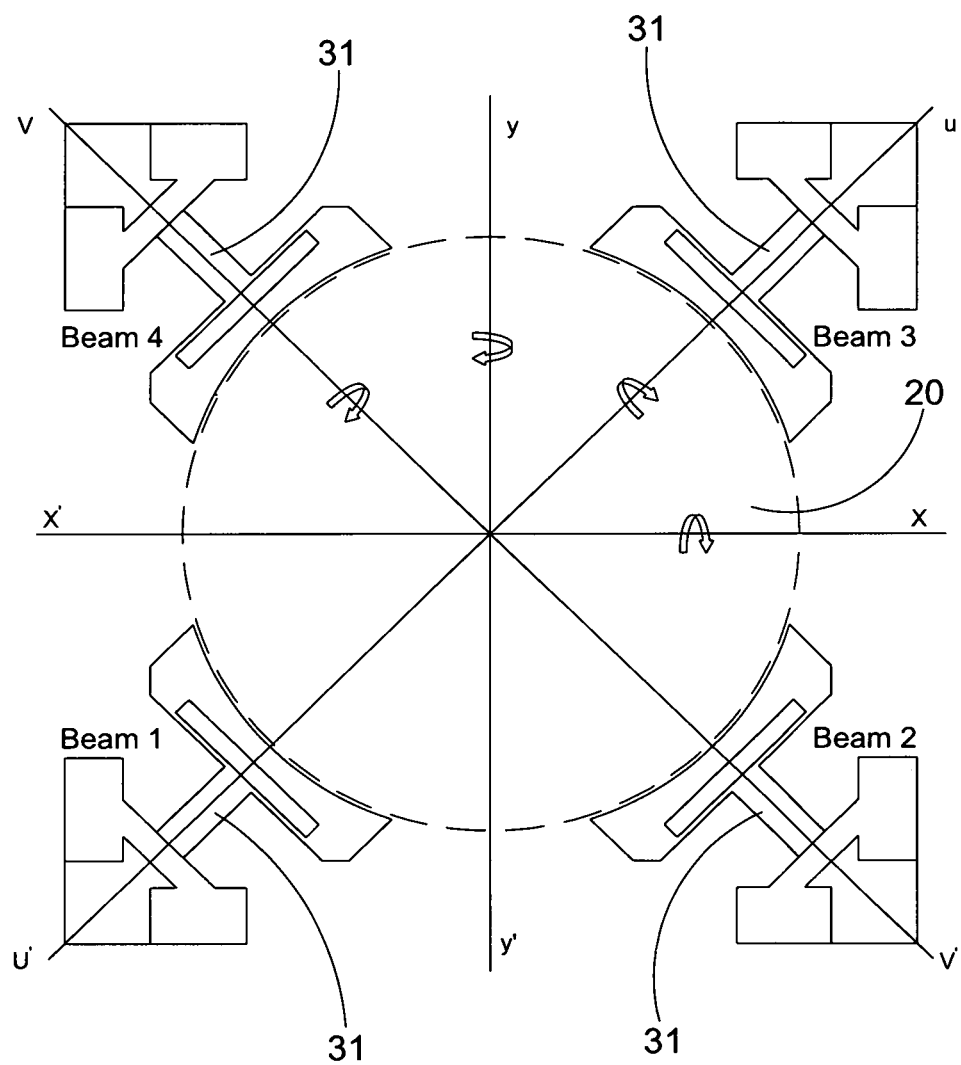
FIG. 32 illustrates the operation of the micro actuators being controlled individually to rotate the lens barrel for suppressing hand shake along different axes according to the above preferred embodiments of the present invention.

It is worth mentioning that four individual micro actuators 31 can still be simultaneously activated to achieve autofocus like the integral micro actuator as shown in FIG. 2. With this configuration, referring to FIG. 32, single beam or two beams in pair or even three beams can be controlled to actuate in such a way that hand shake can be compensated along different axes. If only beam 1 and 2 of the micro-actuators 31 as a pair or beam 3 and 4 of the micro actuators 31 as a pair are actuated simultaneously, the lens barrel 20 is rotated along x-x' axis. When beam 1 and beam 4 of the micro actuators 31 as a pair or beam 2 and beam 3 of the micro actuators 31 as a pair are actuated simultaneously, lens barrel 20 can be rotated along y-y' axis. To rotate lens barrel 20 in u-u' axis, either actuate beam 2 of the micro actuator 31 or beam 4 of the micro actuator 31 is necessary. Activate beams 1, 2 and 3 of the micro actuators 31 or beams 1, 3 and 4 of the micro actuators 31 simultaneously can also rotate the lens barrel 20 along u-u' axis. Likewise, only actuate beam 1 or beam 3 of the micro-actuator 31 can cause the lens barrel 20 rotate along v-v' axis. Actuate beams 1, 2 and 4 of the micro actuators 31 or beams 2, 3 and 4 of the micro actuators 31 simultaneously can also rotate the lens barrel 20 along v-v' axis.

Figure 33:
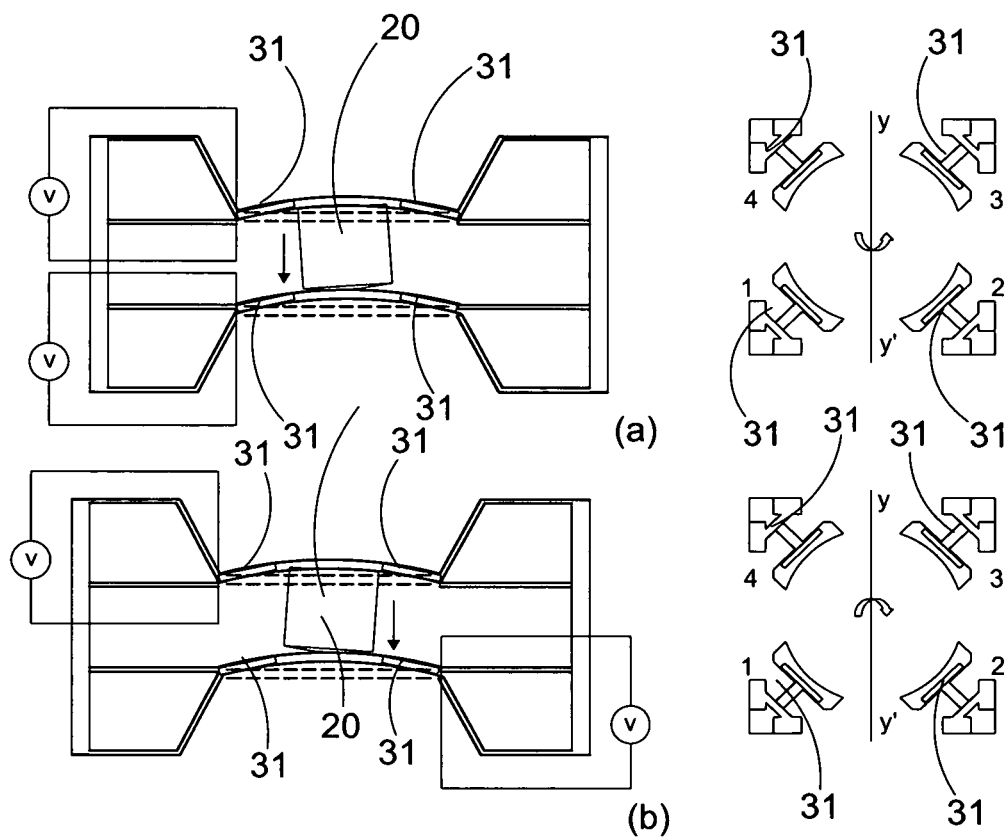
FIG. 33 illustrates the control of the lens barrel by selectively activating one or more micro actuators to rotate the lens barrel according to the above preferred embodiments of the present invention.

Likewise, referring to FIG. 33, for the two upper and lower sets of micro actuators 31, individual beam of the micro actuator 31 or a group of beams of the micro actuators 31 can be actuated simultaneously to achieve desirable rotation of the lens barrel 20 so that hand shake can be compensated. FIGS. 33(a) and (b) show the lens barrel 20 can be rotated along x-axis when beam 1 and beam 4 of micro actuators 31 or beam 2 and beam 3 of micro actuators 31 of the lower set of micro actuators 31 are activated at the same time. Likewise, rotation of the lens barrel 20 along other axes can be achieved by different combinations of actuating beams of the upper and lower sets of micro actuators 31. In particular, the lens barrel 20 to be rotated along the y-y' axis when beam 1 and beam of micro actuators 31, as shown in FIG. 33(a), o when beam 2 and beam 3 of micro actuators 31 of the lower set of micro actuators 31, as shown in FIG. 33(b), are activated at the same time.

One of the advantages of the present invention is that the camera module has lesser structural components comparing with the VCM driven camera module. Accordingly, VCM driven camera module for autofocus function alone comprises of twelve components. At least sixteen components is needed for a VCM camera module with both autofocus and image stabilization functions. Less structural components is an indication of simple assembly processes and lower production cost for camera module. The camera module with the micro actuator 31 of the present invention may have only seven to eleven components. The camera module includes merely two holders formed by injection molding of high performance polyamide. The upper holder that is primarily serves as a cover has also an anti-tilting mechanism in the inner wall of the opening. The micro actuator 31 sits on top surface of the lower holder (base). A limiter for resisting shock is integrally molded with the lower holder.

Another advantage of the present invention is that precise actuation leads to better image quality. The lens driven by VCM can only settle at the target position in 100-200 ms due to overshooting and oscillation. This ringing phenomenon can be overcome by employing a self-calibrated VCM driver. VCM settles fast at target position with little ringing after ringing compensation is enabled. In view of the present invention, the thermal micro actuator 31 has been integrated with slider and assembled on to a printed circuit board for performance testing. This dual-stage micro actuator 31 demonstrated adequate and fast displacement (20 nm at 1 KHz) without ringing.

The measure displacement of the micro actuator 31 of the present invention implies that there would not be significant ringing provided that the designed stiffness of the four actuating beams of the micro actuators 31 are high enough. Tremendous reduction in ringing leads to better and clearer image.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A camera module for a portable electronic device, comprising:

a base adapted for being supported in the portable electronic device having a photosensitive sensor;

a lens barrel positioned above said base and in a photosensitive path of said photosensitive sensor; and a lens barrel positioning device, which comprises:

two or more micro actuators operatively linked between said base and said lens barrel at a position that said micro actuators are radially extended from said lens barrel, wherein each of said micro actuators is bendable in response to thermal energy, wherein each of said two or more micro actuators comprises one or more micro fins, a thermally expandable polymer filled at gaps between said one or more micro fins, and a micro heater; and a control unit which comprises at least a heater circuit operatively linked to said micro actuators to controllably apply said thermal energy to each of said micro actuators, wherein each of said micro actuators is bent correspondingly to move said lens barrel with respect to said base so as to control one to three-axis positioning of said lens barrel, wherein said micro heater is operatively linked to said heater circuit that generates said thermal energy to heat up said thermally expandable polymer to control a thermal expansion thereof so as to control each of said two or more micro actuators bending in responsive to said thermal energy to move said lens barrel with respect to said base in said 3-axis positioning of said lens barrel.

2. The camera module, as recited in claim 1, wherein each of said micro fins has a meandered shape and serves as a heat conductor between said micro heater and said thermally expandable polymer.

3. The camera module, as recited in claim 1, wherein each said micro actuator further comprises a backbone coupled at one side of said micro fins of said micro actuator, wherein said micro heater is provided on an opposed side of said micro fin of said micro actuator.

4. A camera module for a portable electronic device, comprising:

a base adapted for being supported in the portable electronic device having a photosensitive sensor;

a lens barrel positioned above said base and in a photosensitive path of said photosensitive sensor; and a lens barrel positioning device, which comprises:

two or more micro actuators operatively linked between said base and said lens barrel at a position that said micro actuators are radially extended from said lens barrel, wherein each of said micro actuators is bendable in response to thermal energy, wherein said two or more micro actuators are symmetrically positioned around said lens barrel and each of said two or more micro actuators comprises one or more micro fins, a thermally expandable polymer filled at gaps between said one or more micro fins, and a micro heater; and a control unit which comprises at least a heater circuit operatively linked to said micro actuators to controllably apply said thermal energy to each of said micro actuators, wherein each of said micro actuators is bent correspondingly to move said lens barrel with respect to said base so as to control one to three-axis positioning of said lens barrel, wherein said micro heater is operatively linked to said heater circuit that generates said thermal energy to heat up said thermally expandable polymer to control a thermal expansion thereof so as to control each of said micro actuators bending in responsive to said thermal energy to move said lens barrel with respect to said base in said 3-axis positioning of said lens barrel.

5. The camera module, as recited in claim 4, wherein each of said micro fins has a meandered shape and serves as a heat conductor between said micro heater and said thermally expandable polymer.

6. The camera module, as recited in claim 5, wherein each said micro actuator further comprises a backbone coupled at one side of said micro fins of said micro actuator, wherein said micro heater is provided on an opposed side of said micro fin of said micro actuator.

7. The camera module, as recited in claim 6, wherein said base comprises a stage that said lens barrel is supported thereon and a frame that said actuators are operatively extended between said frame and said stage, wherein said micro actuators are capable of bending to move said stage with respect to said frame in order to control said 3-axis positioning of said lens barrel.

8. The camera module, as recited in claim 6, wherein said base comprises two or more base blocks coupled to said micro actuators respectively, such that said micro actuators are operatively extended between said lens barrel and said base blocks respectively.

9. The camera module, as recited in claim 7, wherein each of said micro actuators is preheated by said heater circuit at a reference temperature point to calibrate a neutral position of said lens barrel independently to an ambient temperature change, such that when each of said micro actuators is heated by said heater circuit above said reference temperature point, said micro actuator is bent to move said lens barrel from said neutral position thereof.

10. The camera module, as recited in claim 8, wherein each of said micro actuators is preheated by said heater circuit at a reference temperature point to calibrate a neutral position of said lens barrel independently to an ambient temperature change, such that when each of said micro actuators is heated by said heater circuit above said reference temperature point, said micro actuator is bent to move said lens barrel from said neutral position thereof.

11. The camera module, as recited in claim 7, wherein said micro actuators are configured to have an upper set of micro actuators coupled to an upper portion of said lens barrel and a lower set of micro actuators coupled to a lower portion of said lens barrel, wherein said upper and lower sets of micro actuators are opposing with each other in a symmetrical manner that said lens barrel is held at a neutral position independently to an ambient temperature change.

12. The camera module, as recited in claim 8, wherein said micro actuators are configured to have an upper set of micro actuators coupled to an upper portion of said lens barrel and a lower set of micro actuators coupled to a lower portion of said lens barrel, wherein said upper and lower sets of micro actuators are opposing with each other in a symmetrical manner that said lens barrel is held at a neutral position independently to an ambient temperature change.

13. A camera module for a portable electronic device, comprising:

a base adapted for being supported in the portable electronic device having a photosensitive sensor;

a lens barrel positioned above said base and in a photosensitive path of said photosensitive sensor; and a lens barrel positioning device, which comprises:

two or more micro actuators operatively linked between said base and said lens barrel at a position that said micro actuators are radially extended from said lens barrel, wherein each of said micro actuators is bendable in response to thermal energy; and a control unit which comprises at least a heater circuit operatively linked to said micro actuators to controllably apply said thermal energy to each of said micro actuators, wherein each of said micro actuators is bent correspondingly to move said lens barrel with respect to said base so as to control one to three-axis positioning of said lens barrel, wherein each of said micro actuators is preheated by said heater circuit at a reference temperature point to calibrate a neutral position of said lens barrel independently to an ambient temperature change, such that when each of said micro actuators is heated by said heater circuit above said reference temperature point, said micro actuator is bent to move said lens barrel from said neutral position thereof.

14. A camera module for a portable electronic device, comprising:

a base adapted for being supported in the portable electronic device having a photosensitive sensor;

a lens barrel positioned above said base and in a photosensitive path of said photosensitive sensor; and a lens barrel positioning device, which comprises:

two or more micro actuators operatively linked between said base and said lens barrel at a position that said micro actuators are radially extended from said lens barrel, wherein each of said micro actuators is bendable in response to thermal energy, wherein said micro actuators are configured to have an upper set of micro actuators coupled to an upper portion of said lens barrel and a lower set of micro actuators coupled to a lower portion of said lens barrel, wherein said upper and lower sets of micro actuators are opposing with each other in a symmetrical manner that said lens barrel is held at a neutral position independently to an ambient temperature change; and a control unit which comprises at least a heater circuit operatively linked to said micro actuators to controllably apply said thermal energy to each of said micro actuators, wherein each of said micro actuators is bent correspondingly to move said lens barrel with respect to said base so as to control one to three-axis positioning of said lens barrel.

* * * * *